United States Patent
Balasubramanian

(10) Patent No.: US 10,482,337 B2
(45) Date of Patent: Nov. 19, 2019

(54) ACCELERATING CONVOLUTIONAL NEURAL NETWORK COMPUTATION THROUGHPUT

(71) Applicant: Infineon Technologies AG, Neubiberg (DE)

(72) Inventor: Prakash Kalanjeri Balasubramanian, Bangalore (IN)

(73) Assignee: Infineon Technologies AG, Neubiberg (DE)

( * ) Notice: Subject to any disclaimer, the term of this patent is extended or adjusted under 35 U.S.C. 154(b) by 133 days.

(21) Appl. No.: 15/719,829

(22) Filed: Sep. 29, 2017

(65) Prior Publication Data
US 2019/0102640 A1 Apr. 4, 2019

(51) Int. Cl.
| G06K 9/00 | (2006.01) |
| G06F 3/06 | (2006.01) |
| G06K 9/46 | (2006.01) |
| G06K 9/62 | (2006.01) |
| G06N 3/04 | (2006.01) |

(52) U.S. Cl.
CPC ....... G06K 9/00979 (2013.01); G06F 3/0625 (2013.01); G06F 3/0656 (2013.01); G06F 3/0659 (2013.01); G06F 3/0685 (2013.01); G06K 9/46 (2013.01); G06K 9/6256 (2013.01); G06K 9/6267 (2013.01); G06N 3/04 (2013.01); G06K 9/00805 (2013.01); G06K 9/00818 (2013.01)

(58) Field of Classification Search
None
See application file for complete search history.

(56) References Cited

U.S. PATENT DOCUMENTS

| 9,373,059 B1 * | 6/2016 | Heifets | G16B 40/00 |
| 2016/0179434 A1 * | 6/2016 | Herrero Abellanas | G06F 17/153 711/155 |
| 2016/0307071 A1 * | 10/2016 | Perronnin | G06K 9/4628 |
| 2017/0046616 A1 * | 2/2017 | Socher | G06N 3/088 |
| 2017/0116497 A1 * | 4/2017 | Georgescu | A61B 6/032 |

* cited by examiner

*Primary Examiner* — Hadi Akhavannik
(74) *Attorney, Agent, or Firm* — Eschweiler & Potashnik, LLC

(57) ABSTRACT

Convolutional neural network (CNN) components can operate to provide various speed-ups to improve upon or operate as part of an artificial neural network (ANN). A convolution component performs convolution operations that extract data from one or more images, and provides the data to one or more rectified linear units (RELUs). The RELUs are configured to generate non-linear convolution output data. A pooling component generates pooling outputs in parallel with the convolution operations via a pipelining process based on a pooling window for a subset of the non-linear convolution output data. A fully connected (FC) component configured to form an artificial neural network (ANN) that provides ANN outputs based on the pooling outputs and enables a recognition of a pattern in the one or more images based on the ANN outputs. Layers of the FC component are also able to operate in parallel in another pipelining process.

18 Claims, 18 Drawing Sheets

US 10,482,337 B2

ACCELERATING CONVOLUTIONAL NEURAL NETWORK COMPUTATION THROUGHPUT

FIELD

The present disclosure is in the field of neural networks, and more specifically, increasing the throughput of convolutional neural networks.

BACKGROUND

In machine learning, a Convolutional Neural Network (CNN, or ConvNet) is a type of feed-forward artificial neural network in which the connectivity pattern between its neurons is inspired by the organization of the animal visual cortex. Individual cortical neurons respond to stimuli in a restricted region of space known as the receptive field. The receptive fields of different neurons partially overlap such that they tile the visual field. The response of an individual neuron to stimuli within its receptive field can be approximated mathematically by a convolution operation. Convolutional networks were inspired by biological processes and are variations of multilayer perceptions designed to use minimal amounts of pre-processing. They have wide applications in image and video recognition, recommender systems and natural language processing. The convolutional neural network can also be known as a Shift Invariant or Space Invariant Artificial Neural Network (SIANN), which is named based on its shared weights architecture and translation invariance characteristics.

A CNN can be made up of various computation layers, namely a convolution layer, a Rectifier Linear Unit (RELU) layer, a pooling layer, a fully connected (FC) layer and output layer(s). These CNN layers operate to make decisions using artificial intelligence processes that build upon image processing techniques. Chipset suppliers have successfully accelerated CNN throughput by focussing on the convolution layer. They have added more Single Instruction Multiple Data (SIMD) Multiply Accumulate (SIMD MAC) units and also enabled their digital signal processors (DSPs) to operate at significantly higher frequencies. Some suppliers also offer powerful scatter-gather direct memory access (DMA), which can be advantageous for two dimensional (2D) convolutions. However, solutions thus far can lead to increases in switching power consumption.

DETAILED DESCRIPTION

Figure 1:
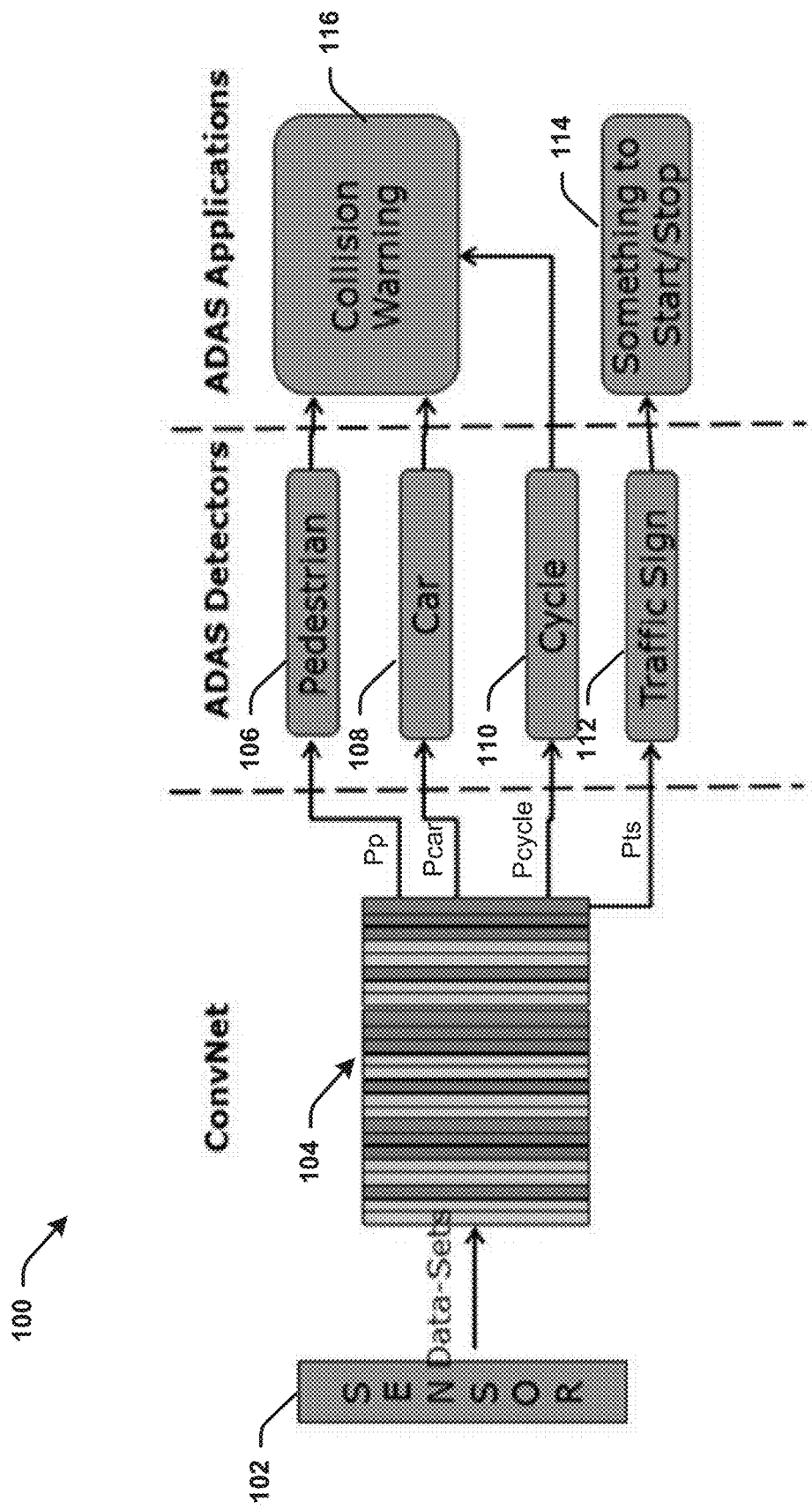
FIG. 1 illustrates a block diagram illustrating a convolutional neural network (CNN) system according to various aspects (embodiments) described.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor, a process running on a processor, a controller, an object, an executable, a program, a storage device, and/or a computer with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

In consideration of the above described deficiencies of CNNs, various aspects/embodiments enable increases in total computation gain across the various CNN computation layers. The aspects/embodiments serving as solutions of this disclosure decrease power consumption and increase throughput, while not increasing cost, but lowering cost within CNN systems. The embodiments or aspects described herein accelerate execution of the pooling and the FC layers without increasing CPU frequency and adding to the cost of additional CPUs. Therefore, the methods and systems disclosed can further increase efficiency by not increasing power consumption, and further increase processing speeds. For example, execution of convolution and the pooling layers can be pipelined with respect to one another, leading to significant speedup gains by enabling data flow processors to begin processing sectors of Convolution/RELU layer outputs immediately upon availability.

Additionally, the FC layer execution can also be pipelined with respect to components or FC layers of components forming a neural network therein. This further contributes to additional speedup gains, together with pipeline processing among the convolution/RELU layers and the pooling layer.

Execution pipelining can be achieved by using data flow processing operation principles. A well-trained CNN, for example, can reliably classify sensor data into certain categories/classes that enable driver assistance systems to make critical decisions such as reducing the engine speed, braking, halting, or other similar actions, either related to the safety of automotive driving or other CNN systems.

Additionally, a two-dimensional (2D) convolution can be carried out by sliding a filter kernel one pixel at a time over a two-dimensional image, for example. In another example, a convolution sliding window (e.g., a 3×3 convolution sliding window or other size of n×n convolution sliding window, with n as a positive integer) can be selected to perform convolution of an image that has been received from sensor data retrieved, and then multiplied with the filter kernel as an inner dot product operation.

Each (sub)set of the window data can be first loaded into a SIMD register, for example. The convolution window data and the filter kernel can both be provided to a SIMD MAC unit, which performs the MAC operations over several cycles resulting in convolution outputs stored in a memory or buffer. Even though the entire image or sets of data for a given sector of the image or the entire image for processing has not been completed by the corresponding filter kernel or filter kernels analysing with the same feature (or hierarchy of data), pooling can commence immediately on values outputted by just a subset or window of data itself for a particular filter kernel or feature that the filter kernel is trained to analyze, which can be used to scan and calculate subsets of pixels as they correspond to the data.

Furthermore, a Net Function (NF) and Output Function (OF) of each neuron of a fully connected (FC) layer can be sequentially executed in software. An instance of NF is succeeded by the OF. In further embodiments of the disclosure, execution of the OF can be triggered as soon as its NF produces an output. While an OF executes, the NF of another neuron component can be taken up for execution in parallel via pipeline processing.

The observation(al) unit of a processor component can be leveraged and extended to support the required data flow processing. A new set of tables can be generated dynamically to enable instructions to be present. Memory addresses of data, which is output by the NF components of neurons of a FC layer can be programmed from a first column of the table, while addresses of corresponding OF output data can be populated into a second column of the table. An activation function can be executed and programmed into a third column of the table. As soon as software executes the NF, the output is written to a corresponding address specified in the first column, a transaction match/monitoring component/unit can trigger an OF co-processor to execute the output function specified in the third column and store the output at an address specified in the second column. As such, additional speedup or efficiency gain from the FC layer pipelining can complement the pipelining of the pooling layer with the convolution layer/RELU layer, which can be performed as an additional speedup. Thus, the completion of the execution of a net function of a neuron in the FC layer can be determined while the execution of an activation function in the next neuron executes for another speedup within the CNN system as an additional speedup and additional pipelining operation. Additional aspects and details of the disclosure are further described below with reference to figures.

FIG. 1 illustrates an example of a CNN system 100 that can reliably classify images into a certain categories/classes allowing driver assistance systems to take critical decisions such as reduction in engine speed, braking, halting, or other functions involving an automobile, other vehicle or device. An automated navigation system 100 for example can include one or more sensors 102 providing data sets as inputs to a CNN 104 that includes multiple different computational/processing layers with various components. The CNN 104 then provides outputs to one or more ADAS detectors 106-12 (e.g., a pedestrian detector 106, a car detector 108, a bicycle or motorcycle detector 110, a traffic sign detector 112 or other detector) that detects whether a condition is present in relation to a category (pedestrian features, car features, cycle features, traffic sign features, etc.) of data corresponding to any one detector 106-112. Based on whether a given detector determines a condition is present from the output data of the CNN, the detector 106-112 can signal for an application such as a collision warning 116, a braking function to stop/slow, something to start/stop or other application function associated with a function for responding to the condition as part of automated vehicle navigation or the other system/device function, for example.

In one example, the sensor 102 can include an image capturing device such as a camera, radar, light detection and ranging (LIDAR), other image scanning devices, or other sensors for detecting and processing data from images, such as those received on the signals from an image capturing device. The data sets from the sensors 102 can be then provided to the CNN 104 to take the signals and then try to find out what the signals are presenting. For example, a car driving on a highway with front-camera sensor attached could return pictures/images of a traffic sign, if there was any, a lamp post, if there was one, or if there was a car driving ahead, then possibly the pictures of the car would also be returned as part of the sensor data.

Generally, in autonomous driving systems with the driver taking backseat, a lot of the decisions that a human would have taken, such as slowing down, applying the brake, sounding the horn, or other actions are essentially done by the automated navigation/piloting system, with the specialized computer processing components on board, and for them to decide what is to be done next, it is important to understand what is lying ahead of them. As such, a primary objective of the system and the CNN 104 is to determine what is contained in these pictures/images, and then based on what is found in these pictures, implement further decisions.

For example, if analysis of one or more pictures/images indicates a condition/pattern in the images that a human being is present in the middle of the road about 100 meters away, then the on-board computer obviously decelerates and possibly brings the vehicle to a stop accordingly. Alternatively, if a determination is made to accelerate based on the condition within the images, then it would simply direct the vehicle to change lanes, and then accelerate. As such, these decisions, or other decisions can be derived from the nature of the data analyzed within the images as patterns of features that are returned back by the system and then analyzed for any number of given conditions being present in the images or not. The system can be robust with the initial training of filters or kernel filters while learning to detect possible variants to recognize conditions among various circumstances.

CNN 104 can include a series of different computations that can be connected and dependent to one another as CNN computation layers, including various components to provide results of the computations of a given layer to the next layer. These layers can be seen in FIG. 1 as various layers in the CNN 104 block with different shading. At the end of the computation pipe emerges the outputs (e.g., Pp, Pcar, Pcycle, Pts) that can include different probabilities from among the various possible conditions within the image(s) or a sector subset of the image(s). By summing up these probabilities, the values obtained can equal to one (1), for example. The object type or category/class type with the greatest probability then can be the one in which the image or image sector corresponds to, be detected as such by one or more detectors 106-112, and acted upon by one or more of the applications 114 and 116.

For example, if the image contained a pedestrian, the pedestrian ADAS detector 106 can be configured to send a signal to a braking system to apply brakes. Any number of items could be detected within the image by one or more detectors 106-112, not just a pedestrian as an example. Further, in response to a pattern of an object/category type being detected by the convolution neural network system, a signal can be provided that triggers a component to make further decisions based on one or more predefined criteria. For example, the pedestrian detector could send an image message to a collision warning component/system indicating that a pedestrian is being detected. The collision warning system could instantly take cognizance, possibly apply a brake to slow down, slow a vehicle while moving to a direction to the right or left, or another decision based on the pattern recognition of the pedestrian in the image, thereby avoiding a fatal collision. Similar example can be made out of other patterns or conditions being detected within the images from sensor data, such as a car detection, a cycle, a traffic sign, or any other external pattern triggering an action upon being detected.

Figure 2:
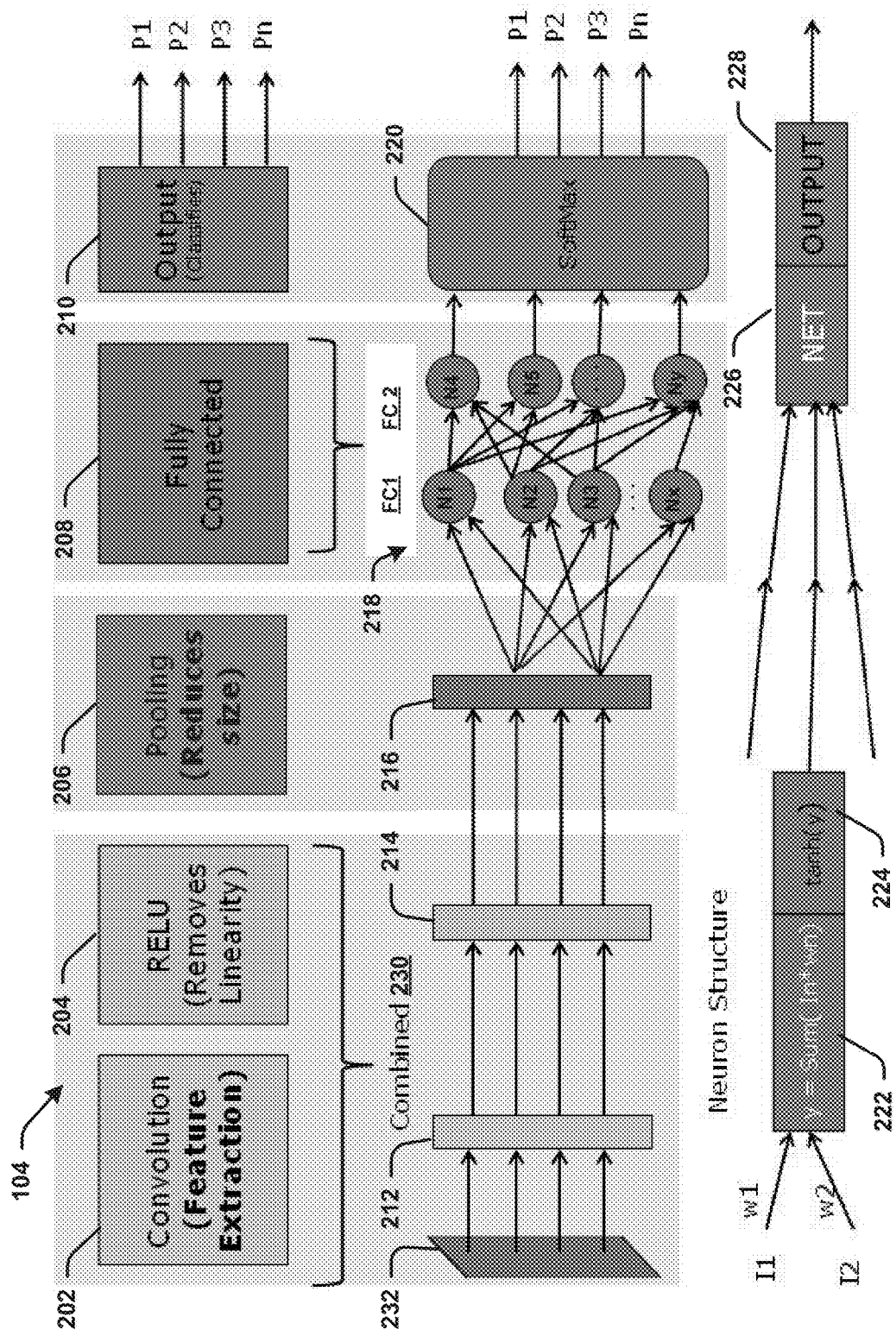
FIG. 2 illustrates a block diagram illustrating a CNN according to various aspects described.

Referring to FIG. 2 is a further example in greater detail of the various computation layers making up the CNN 104, in particular. The CNN 104 can comprise a number of computational layers, including a convolution layer 202, a rectified linear unit (RELU) layer 204, a pooling layer 206, a fully connected (FC) layer 208 (artificial neural network layer), and an output layer 210. Although five computational layers are demonstrated, more or less computational layers can be envisioned as one of ordinary skill in the art could appreciate. A layer, or computation(al) layer, as used herein, can refer to one or more components that operate with similar function by mathematical or other functional means to process received inputs to generate/derive outputs for a next layer with one or more other components for further processing within a convolutional neural network system.

The convolution layer 202, for example, can include one or more convolution components 212 that extract data slices of an image 232 as data sets. The convolution layer 202 can be combined with the rectified linear unit (RELU) layer 204 to also be considered or referred to as one computational layer 230, or, in general, as a convolution layer 230. In particular, convolution operations can be performed by the convolution component 212 to extract features from images being received as inputs from input terminals thereat, such as camera data, radar data, other sensor data or the like. For example, a human face or other feature can be detected from among convolutional data generated by the convolution operations as results outputted by the convolution component 212. The convolution processes can be performed on sets/segments/subsets/portions of the image data, for example, along sections of an image 232 for a particular feature. Initially at first pass, the convolution operations generated by the convolution component 212 can extract low-level features. This can be performed with a sliding window of a particular size (e.g., a window size n×n for a convolution operation, with n being a positive integer, or n×p where n and p are different positive integers as well), in which a sliding convolution is performed with overlapping data from the image 232 in an incremental fashion across the whole of the image 232. Then in subsequent passes or iterations, additional higher-level features can be extracted by combining the results of the previous convolution operations performed for lower-level feature extractions, either by the same component or different ones. The iterations can then continue in order to generate different hierarchical levels of data with one or more different iterations or passes of the image.

For example, a human face can have contours, sloping lines, curves, etc . . . In one set of convolutional data low-level features (lines, slopes, curves, etc.) can be extracted, for example, to then determine where there is an oval shape in the image, features that look like the edges of an ear, or other features that make up basic structural data for a particular feature/pattern that could be a part of determining whether a certain pattern or conditions exists within the image 232 based on a combination of hierarchical data sets, such as a human on a collision path with the car or other system of components comprising the convolutional neural network, for example.

These convolution operations can result in a feature map. A feature map can be considered the output of one convolution component 212 applied to either image 232 from sensor or output data of a previous layer of operations. A filter instance, for example, is drawn across its receptive field in the output of a previous layer, moved one pixel or more at a time. A receptive field can be referred to as a small area/subset area of an image connected to a filter (filter kernel). For example, a filter can analyze for a presence of a triangle as a feature. Instead of one filter sliding across a complete image looking for existence of triangle(s), various filters can analyze/govern various areas of the image for triangle(s) or other particular feature, for example.

Convolution at each position of the filter in its receptive field can result in yielding a measure of presence of the feature represented by the kernel at that position. The measure of the presence of a feature at all convolution positions can be the feature map of the filter kernel. For example, if a convolution filter is slid one pixel at a time, then the new convolution field can overlap with the previous convolution field by (field width−1) input values. For example, in a 32×32 image, dragging the 5×5 convolution kernel across the input image data with a stride width of one pixel results in a feature map of size 28×28 (32−5+1×32−5+1) output per convolution filter. The terms "convolution kernel", "convolution filter kernel", "filter", "kernel" and "filter kernel" can be used interchangeably herein, in which additional details are provided below (e.g., with reference to FIG. 3). Also as used herein, a stride width or length can define how much a sliding window shifts or how a filter convolves around a volume of input data.

After extracting the lowest level of information as low-level features, the outputs can be combined by the convolution components 212 of the convolution layer 202 as convolution information or convolution data sets, such as by combining two edges/lines and analyzing whether the combination corresponds to a nose, or if it corresponds to an eye, for example, with at a detector 106-112. The combinations of these low-level features (e.g., edges, lines, etc.) can also form data sets corresponding to slightly standard features (e.g., a medium hierarchy level) related to a condition in the image 232 such as for a human face, nose, ears, eyes, forehead, facial hair, and so on, in a hierarchy of convolutional data sets, each set comprising a greater complexity of extracted data features. Further, the data sets can be combined in a progression along a feature map of the images and further process along the computational layers until the system is able to discern high level features, and determine a complete human face as an object/high-level feature within the images, for example.

In this manner, low-level features (e.g., a curve, an edge, a line, slope, etc.) can be one level of data set hierarchy, and another level of convolutional data sets (e.g., a shape, a combination of patterns, etc.) can form another hierarchy level, while any number of convolutional data sets can be generated from convolutional operations in a hierarchy of data sets to determine higher levels of patterns, including a face, a human, an animal, a bicycle, motorcycle, sign, details of a sign, or any number of conditions (e.g., a human in a collision path, an animal crossing into collision path, or other situation occurring in one or more images).

Because convolution operations can be linear, the convolution layer 202 does not completely and always reflect what could be considered the real world behavior, which does not typically follow a fixed path and is usually random. Thus, to generate the output of convolution with more randomness, the RELU layer 204 can be configured into the CNN system/component 104, and further combined as part of the combined convolution layer 230. The convolution components 212 can be connected to RELU components 214 of the RELU layer. The RELU components 214 can be configured to generate sets of non-linear convolution output data by removing linearity from the convolution data outputted from the convolution components 212 to RELU inputs. The RELU components 214, for example, can monitor inputs for negative values that can occasionally be contained in the output of convolution. Then, based on the convolutional data sets received as these inputs generate a similar hierarchy of data sets as the non-linear convolution output data. In response to detecting any negative values, the RELU components 214 replaces them with either a zero or a positive value. In this way, the linear output of the convolution layer 202 can be transformed into at least slightly or marginally nonlinear data as nonlinear convolutional output data.

With the features extracted and linearity removed, the pooling layer 206 at pooling components 216 receive the nonlinear convolutional output data to make it scale invariant. Thus, regardless of the position, the illumination, the impurity of the image being analyzed, the CNN system can be intelligent and robust to be able to detect a variant of the same picture/image.

Thus, the convolution layers 202 can generate feature extraction. RELU layers 204 remove linearity from data to make them consistent with real-world data. The pooling layers 206 are responsible for volume reduction and render the network image scale invariant, which can be similar to or compared with other image processing techniques such as scale invariant feature transform (SIFT) and histogram of oriented gradients (HoG).

The pooling components 216 are configured to generate pooling outputs via a pipelining process in parallel with the convolution combined layer 230. In an embodiment, pooling components 216 can initiate processing for scaled invariants and perform statistical operations on the first set/subset of convolutional data or the nonlinear convolutional output data. As such, the two different computational layers can be pipelined and operated in parallel with the functions of one another, or process concurrently as the sliding convolution window outputs a portion or some of the entirety of convolution data across an image 232, for example. The convolution/RELU operations of the convolution layer 230, the convolution components 212 or RELU components 214 operate as pipelined processes with the pooling components 216. These pooling components 216 perform statistical operations on the non-linear convolution output data based on a pooling window for a subset of the non-linear convolution output data.

For example, pooling operations reduce the size of the input data (non-linear convolution output data) provided by the RELU layer 204. As each subset of data is received, a single set of nonlinear convolutional output data can be processed, reduced in size at the pooling layer 206, and then subjected to classification at a fully connected (FC) layer 208 and eventually converted to human understandable form by a classifier 210, further detailed below.

The FC network layer 208 of the artificial neural network (ANN) represents the functioning of the human brain with neurons. For example, different values (e.g., 1, 5, 60,000 and a 0.25, or other sets of values) can appear at the inputs of the ANN to enable the determination of a pattern or a condition present in the image data (e.g., a man, a woman, a human being, etc.). If the FC components see a different set of numbers, then the system output will be detected that it is possibly something else.

The output of pooling components 216 of the pooling layer 206 can be fed to the artificial neural network, also known as the FC layer 208, which further determines the most likely candidate that the picture/image is containing. As such, these numbers as outputs of the FC components can then be converted into probabilities by what is known as the output layer 210 and fed to various detectors (e.g., 106-112 of FIG. 1) like the pedestrian detector 106 or traffic sign detector 112 and necessary actions are taken in response at the applications 114 or 116, for example.

The FC components 218 form the ANN with a neuron structure formed by net functions 222, 226 and output functions 224, 228 according to respective first FC layer (FC1) and second (succeeding) FC layer (FC2). The outputs of each neuron N1-Nx and N4-Ny can be dependent on the availability of input data (e.g., I1, I2) and input weights (e.g., w1, w2), instead of a program counter and outside instructions being fetched. This means that each FC component 218 can include one or more data flow processers that operate without fetching an instruction from a memory, but, instead, process in response to an availability of input data at one or more inputs (e.g., I1, I2) in order to immediately/instantaneously process the input data by performing a designation function. The inputs (e.g., I1, I2) can be provided by the pooling outputs of the pooling components 216 or a preceding FC component/layer (e.g., FC 1, N1-Nx) of data being available at FC2 component inputs (e.g., I1, I2).

Data flow processing can be in contrast to, or different from Von Neumann control flow processing/Von Neumann machines/processors that fetch instructions from memory with a program counter in order to process data, rather than process data based on an availability of certain data at an input alone, for example. The FC components 218 can also each individually receive the same plurality of inputs (e.g., I1, I2) at each FC component within a layer (e.g., FC1). For example, N1-Nx all receive an input from each pooling component 216, in which these inputs (e.g., I1, I2) can be the same. Additionally, each second (or succeeding) layer (e.g., FC2, N4-Ny) of FC components likewise can each receive the same inputs (e.g., I1, I2) from the preceding layer of components (e.g., FC 1, N1-Nx, preceding computation layer, or other computation layer) as well, for example, and so on throughout various FC layers 208 (e.g., FC 1, FC 2, etc.), which can be one or more different layers of computational components forming the ANN.

Further, each net function of neurons or FC components 218 of the FC layer 208 can comprise a mathematical operation, such as a dot product of the inputs and weighting by weights (as a weight factored to each input). The inputs (e.g., I1, I2) can be the same and the weights (e.g., w1, w2) vary. Further, a sum of the dot products of the inputs (I1, I2) and weights (e.g., w1, w2) of each input (I1, I2) can also be performed at each FC component. Different FC components 218 can have different weights (e.g., w1, w2), or, alternatively, different inputs (I1, I2) can have different weights (e.g., w1, w2) differently for each FC component 218 receiving the same group/set/plurality of inputs (e.g., I1, I2). Alternatively, these weights can be similar or different from one another, such that at least some FC components 218 could have the same weights (e.g., w1, w2) at the inputs, while other FC components 218 have different weights (e.g., w1, w2) from one another with different values giving weight to or any amount for factoring/considering a corresponding input in processing.

In addition, the output neuron 224, 228 of each FC component 218 can also comprise a mathematical function operating on the results of the net function 222, 226. For example, the output function can comprise a trigonometric function (e.g., tanh, tan, etc.) or other mathematical function that is performed on the weighted inputs and the result of a sum or other operation performed thereon.

Finally, the output layer 210 can include a classifier function 220 that received FC layer outputs or ANN outputs. These classifier functions could include a SoftMax function, for example, whose function could be to squash/compress the outputs of FC layer 208 to values ranging from 0 through 1. The outputs of classifier functions 220 can comprise probabilities, in which the most likely output class corresponding to the input data has the highest probability. The output layer 210 could also be a standard classifier like a support vector machine (SVM), or other classifier, for example.

In embodiments of the disclosure, the execution of the convolution 230 and the pooling layers 206 can be pipelined (via execution pipelining or pipeline processing) leading to significant speedup and efficiency. As discussed above, the pooling layer 208 can operate in parallel with or concurrent to the convolution layer 230 based on the availability of data from a first convolution sliding window operation, and begin processes at the same time or during subsequent sliding window operations being performed on overlapping or subsequent subsets of image data.

Execution pipelining or pipeline processing can be referred to herein as a set of data processing elements, components or functions connected in series, where the output of one component or element is the input of the next one. The elements or components of a pipeline can be executed in parallel or in time-sliced fashion; in that case, some amount of buffer storage can be inserted between elements. Instead of waiting for a previous or preceding component to completely finish operating on a set of input data, the subsequent or succeeding component or element can begin processing immediately on a partial or incomplete set of results from the previous/preceding element or components, for example. In this manner the components of the pooling layer can be configured, for example, to operate on at least partial results from the convolution combined layer 230 as one speed-up.

In other embodiments, the FC layer 208 execution can also be pipelined, and thus, contributing to additional speedup and efficiency. Further, the FC components 218 as neurons can also be pipelined to begin processing in response to partial output data from the previous or preceding FC component 218 in order to function in parallel with one another. For example, the net function 222 of a neuron (e.g., N2) of FC1 can begin processing before the output function 224 of a preceding FC component (e.g. N1) is completed, and in parallel with the processing operations of the output function 224 of the preceding FC component (e.g., N1) of FC 1. Subsequently, FC components can likewise operate in parallel to one another via such pipeline processing operations.

Figure 3:
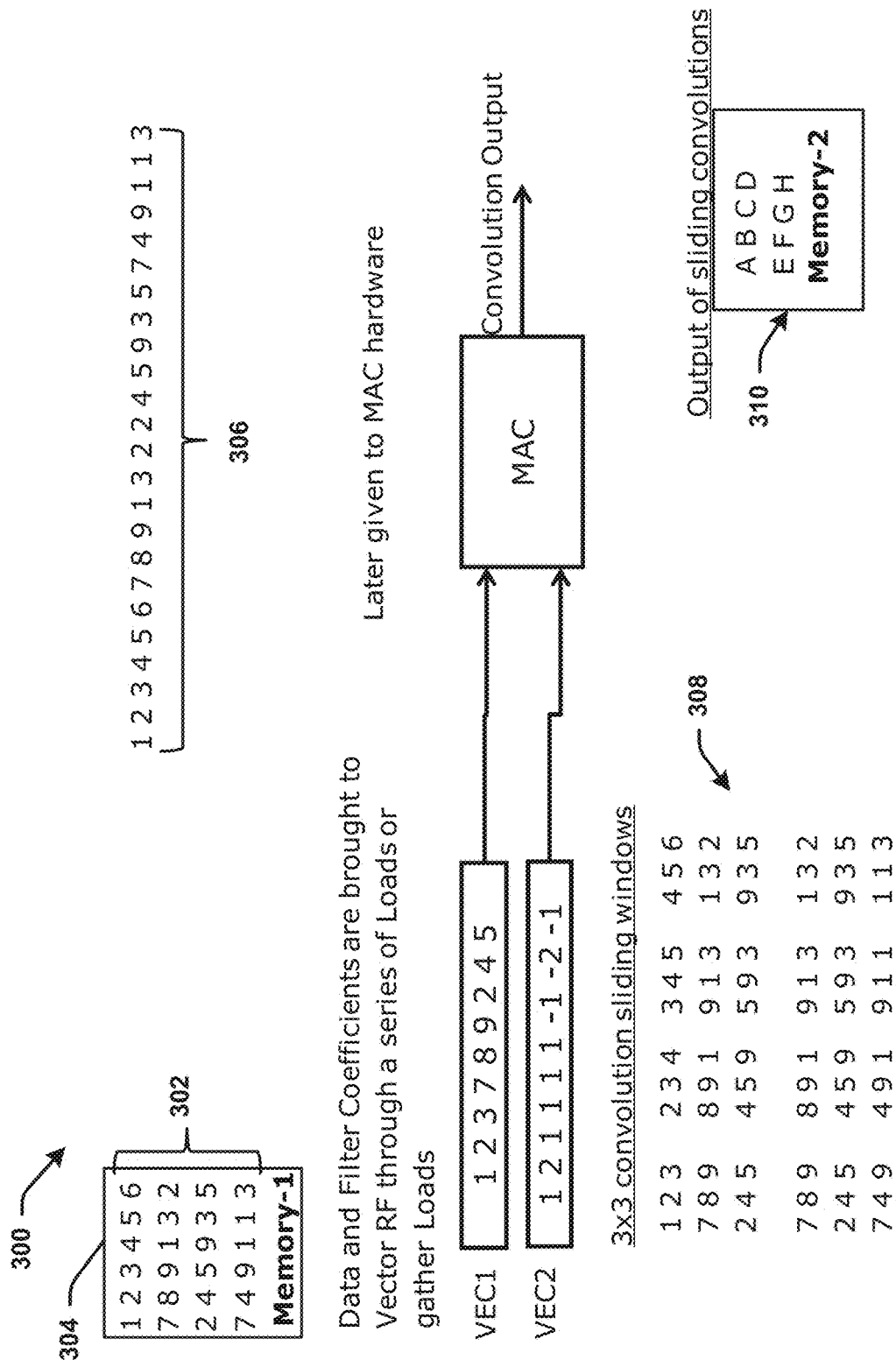
FIG. 3 illustrates a diagram of aspects of convolution operations and some related components according to various aspects described.

Referring to FIG. 3, illustrated is an example of representative convolution data results 300 in accordance with various aspects/embodiments herein. Convolution operations can be utilized by convolution components 212 of a convolution layer 202 or as a combined convolution layer 230 with RELU components 214 as described above with reference to FIG. 2. Convolution components 212 of the convolution layer 230 can be configured to generate weighted multiplications and summations, for example. In terms of signal processing, these operations can be single dimensional, and in the case of image processing, the convolution operations can be two-dimensional such that there can be various weights along an X axis and a Y axis that weigh the inputs differently or similarly by an amount for which each is to be factored or considered in further processing.

In one example, a two dimensional array of numbers 302 can be stored in a memory, represented by memory 304 (memory-1). These values can be representative of an area of data or annotated values provided as inputs to one or more convolution components 212 by sensors (e.g., image/camera/video capturing sensors or the like). These values 302, for example can correspond to an image or a subsection/subset of image data, and are representative here for illustrative purposes of potential values for convolution operations by the convolution components or components of the combined layer 230. These values could be real, imaginary, a function of one or more variables, or other representations of data being received or stored in memory 304, for example. The data 306 can be similar to the data 302, but represented slightly differently, demonstrating the linear storage of data as it is being provided by the sensor(s) 102 to be stored in memory 304, for example.

Convolution is a mathematical operation in which a filter kernel can be slid across an image with the aim of detecting in it the presence of the feature represented by the filter kernel. In CNN systems, a filter kernel can have a fixed area in the image 302 to search for its feature. Hence, multiple instances of a filter can be connected to non-overlapping regions of the image known as local receptive fields. Each of the filter instance searches for the same exact feature but only in its local receptive field in Memory 304. It is thus stated that for every feature which must be searched for, a corresponding set of filter kernel instances connected to locally receptive fields are provisioned. The convolution output of all filter kernel instances of a feature represents the feature map of the feature. Plurality of filter kernels is extended to other features intended to be detected.

A representation of the nose, for example, or a picture of the nose in a particular filter kernel, can be placed on top of the image (captured by sensor data) at a certain location or subset, used to multiply the numbers that are beneath the filter kernel and a sum of the results of the multiplication can be performed by the convolution component 212 to obtain a certain value that is then stored. The kernel can then be slid in a direction (e.g., to the right) by one column. The calculations are then repeated, where the calculations can be repeated with given mathematical operations such as a dot product multiplication and a sum to obtain a result that is stored.

Sliding operations can continue along the x-axis with one or more iterations, and upon reaching the end of the x-axis, along a certain row. The kernel can be brought back to the first column, but then slid down by a row, from where the convolution component 212 repeats the sliding operations again. Overlapping image regions 308 of image 302 represent convolution windows. It is on and along these convolution windows 308 that convolutions are performed by convolution components 212. On a data parallel processor (e.g. SIMD processor), the data belonging to a convolution window and data belonging to a filter kernel can both be loaded into vector registers and fed to a vector multiply-accumulate (MAC) unit. One vector MAC operation can produce one convolution output, for example. This convolution output can then later be stored in Memory 2 (memory 310). After the filter kernel completes convolutions with all of the overlapping convolution windows 308, complete convolution outputs can then be available in convolution output memory 310.

From the convolution processes, hierarchical data sets can be generated in parallel or concurrent to one another according to aspects herein, and afterwards made non-linear by the RELU components 214, in order to determine whether an image contains a picture of a nose and the location within an image. If this determination is affirmative, then those portions of the image that contain the picture of a nose would tend to output higher convolution values relative to other portions of the image.

In one example, under a 3×3 (or other n×n size, or n×p size, with n and p being a positive integer that can be the same or different) convolution sliding window 308, a set of smaller numbers (e.g., 1, 2, 3, 7, 8, 9, 2, 4, 5) can be derived, and then immediately another sequence (e.g., 2, 3, 4, 8, 9, 1, 4, 5, 9) can be generated. These are representative values that could represent values taken from or derived from an image. The sequence of numbers (e.g., 1, 2, 3, 7, 8, 9, 2, 4, 5) can be from an initial area/subset of numbers as convolution sliding window data. By then ignoring the first column and focusing on the numbers starting on the second, third and fourth columns, on the first, second, and third rows another sequence (e.g., 2, 3, 4, 8, 9, 1, 4, 5, 9) could be obtained.

Further utilizing the 3×3 window 308, small sized image data portions that are size 3×3 as an example can be analyzed from the image data stored in memory 304. Other sized windows can also be utilized and the example size is not necessarily exhaustive or limiting to all aspects herein. Sliding the window over by another column, the window results can be 3, 4, 5, 9, 1, 3, 5, 9, 3, forming another sliding window result. A dot product multiplication operation can then obtain each number as the output of sliding window convolutions, which can be represented on the bottom right-hand corner annotated by memory-2 (e.g., 310) as A B C D E F G H. For example, a value or representative result (e.g., A) can basically represent the output of the convolution of a filter kernel with the first window (containing 1, 2, 3, 7, 8, 9, 2, 4, 5, and B representative of the output of convolution of the kernel representing nose (or other feature) with second window containing 2, 3, 4, 8, 9, 1, 4, 5, 9, and so on, where similarly H is the convolution of the filter kernel representing nose (or other feature) with the last window, 1, 3, 2, 9, 3, 5, 1, 1, 3, for example.

A, B, C, D, E, F, G, and H can in various ways indicate a level of an availability of a nose in any one region/subset/area of the data from which the given letter symbol corresponds, or as one level of hierarchical data. For example, if A was a very high value, then there is a high chance that a nose (or other feature corresponding to a kernel or sliding convolution window of the data sets) could be located in this position. As such, convolution can provide a real estimate of whether and where a certain feature is likely to be available in image data. Similarly, other features or any number of features can be analyzed by the convolution components 212 respectively and the combined computation layer 230 for the detection of one or more patterns or conditions within one or more images, which can be called feature detections; the output of which can be illustrated by the convolution outputs 310, for example.

Figure 4:
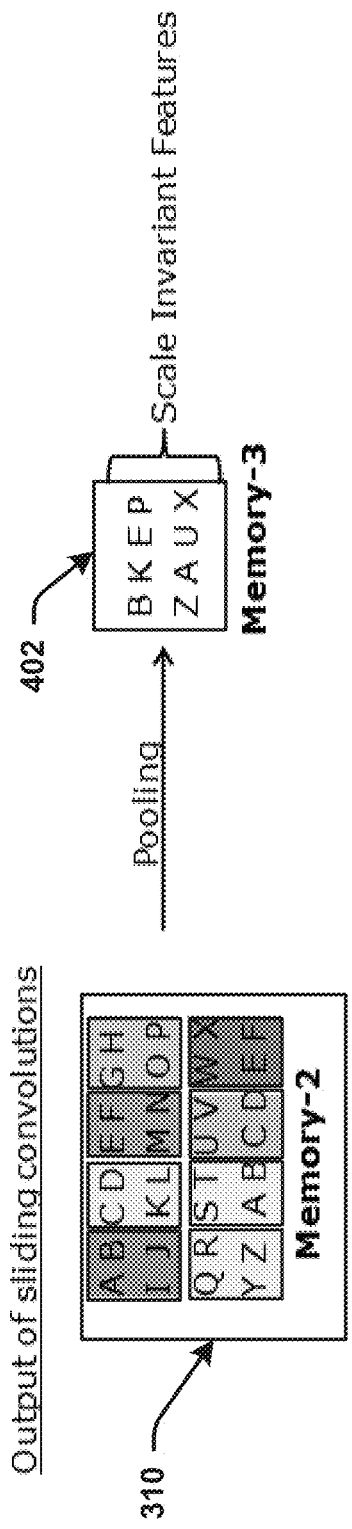
FIG. 4 illustrates a diagram of aspects of pooling operations according to various aspects described.

Referring to FIG. 4, illustrated is a further example of pooling operations of the CNN system 100. The outputs of convolution 310 are further expanded here with memory-2, including the alphabet, with letters being representative of any value or function from a larger image, for example. The pooling components 216 of pooling layer 206 processes the convolution outputs 310 by processing the data by a pruning, trimming, or compression process that reduces the output of convolution 310.

For example, a set of non-overlapping blocks can be represented in different shades or blocks delineated in Memory-2 (memory 310). For example, the block A, B, I, J is different from block/window C, D, K, L, which is different from the block E, F, M, N and the block G, H, O, P, and so on. As such, the pooling components 216 of FIG. 2 can process the output of convolution and sector non-overlapping regions 2×2, which is two along the X axis and two along the y-axis in each of these 2×2 cells by performing a statistical operation to achieve the pooling outputs 402 to be stored in memory-3, for example. These pooling outputs 402 represent scaled invariant features.

Although a non-overlapping region of 2×2 is illustrated and described herein as an example, other sizes could also be envisioned and utilized so that a p×n non-overlapping block/window can be used, where p or n can be any positive integer other than zero, vary from one another or be the same, for example.

The statistical operation performed by the pooling components 216 can comprise a minimum, a maximum, an average, a median, or other statistical operation (e.g., of A, B, I, J) of a window of the sliding convolutions. The pooling components 216 could perform pooling operations of any statistical operation, but in most implementations the statistical operation used by the pooling components can be a maximum.

As such, from each of these 2×2 block windows (or other size of blocks/windows) on the output of sliding convolutions 310, a value can be selected (e.g., the representative B). In this example, B has been chosen, K has been chosen from the next block, followed by E, P and Z, A, U, X, as stored in Memory-3 402 and comprising the pooling outputs as scaled invariant features or as a volume reduced outputs derived from the convolution outputs 310 from the convolution components 212 or sets of nonlinear convolution output data from the RELU components 214. The pooling components 216 can thus generate a reduction in the data size from the inputs it receives as a pooling operation. The output of the pooling operations can then be input to the artificial neural network or the FC layer 208, which further tries to make determinations on the patterns/conditions within the images for further decisions to be made.

In various aspects, particular component hardware can be assigned to perform these computations so all that all a main processor (e.g., an engine control unit, or other main processing component) has to do is to tell the convolutional neural network component hardware the following: i) there is an image to be analyzed, and ii) after determining what the image is, provide an indication of the results. As such, computations of the various layers of the CNN 104 can be offloaded to a CNN accelerator, for example, to perform the computations in the background to the results back to the main processor. While this can be a good solution for power and performance efficiency, it can come at a cost because such a hardware unit can occupy a significant area on microcontrollers as well as consume a significant amount of power for functionality. Thus, aspects herein can also enable elimination of the need for a dedicated hardware accelerator and instead reuse certain infrastructure on the chip by using certain one or more smaller lightweight components, not as intensive as a dedicated CNN accelerator. As such, cost can be reduced as well as performance be maintained without overloading the main processor.

In an embodiment, the pooling processors 216 can operate via pipelining operations by operating in parallel with the convolution components 212, or with the combined convolution+RELU layer 230 and associated processes. Instead of each layer of the CNN 104 initiating into action only after the preceding layer has finished all computation operations (e.g., all outputs of sliding convolution 310 are generated either for a certain hierarchy of features or an iteration over an entire image of subset image portions), the pooling components 216 can initiate pooling operation on a pooling window as soon as such a window has been produced by its predecessor (e.g. convolution components 212) as against typically waiting for all of the pooling windows to be produced by its predecessor.

For example, as a trigger event (e.g., referred to also as an access match or observation(al) unit output), a block of data can be available at inputs for processing to the next layer, and thus, the next layer immediately start computation. As such, processing gain can be increased by starting the pooling operation as soon as the convolution layer 202/212 has computed one block/window of computation outputs (e.g., one of the shaded block A, B, I, J).

Rather than waiting for the convolution layer to generate the convolution outputs A, B, C, D, E, F, G, etc., all the way to F in the bottom right hand corner of outputs 310 of memory-2 to initiate pooling of the outputs, the pooling components 216 can process in response to a trigger event or indication (or access match) based on data availability. For example, a trigger event can be the writing to a location in the memory-2 that corresponds to the last value for the given window (e.g., J for the first shaded block of the 2×2 window). As such, as soon as an element, value or any factor of a 2×2 block is written to a memory or a particular memory location, a first pooling component 216 can be triggered to immediately begin processing pooling operations on the data available.

In another embodiment/aspect, a trigger indication in this example can additionally or alternatively be an availability of an output of sliding convolution that corresponds to a last value, a position or a result of a p×p window (e.g., 2×2 non-overlapping data block), where p can be any positive integer. Further, this trigger can extend to include an availability of data at all inputs corresponding to various input data, so that once all inputs receive a datum, as with a dataflow processing flow, regardless of whether the reception of data itself is complete/ended, or the previous layer (e.g., combined layer 230, a convolution component 212, a RELU component 214, or the like) is complete, processing in the next layer can be triggered (e.g., via a pooling component 216).

In response to the availability of a value or an indication of a writing operation at a particular position, a pooling operation on a completed block or non-overlapping window (e.g., a 2×2 window of nonlinear convolution output data or output of sliding convolutions 310) can be initiated by a pooling component 216. The pooling component 216 can perform operations simultaneously alongside, or in parallel with, one or more convolution components 212. While convolution components 212 provide sliding convolution outputs 310, the pooling components 216 can provide final pooling outputs with output addresses 502 for each block (e.g., 8 blocks J, L, N, P, Z, B, D and F). Thus, for example, as soon as J is available from a convolution component 216, the maximum of A, B, I, J can be found as an example statistical operation as part of a pooling operation of a pooling component 216, without waiting for other results such as C, D, E, F, etc. from other windows or subsets of data in the image within the same hierarchy or different hierarchical level of data. Further, as soon as N is available, the pooling operation of E, F, M, N can start without waiting for O to be written to memory. Likewise, as soon as P is available, the pooling computation for G, H, O, P can initiate, and so on for each block of output sliding convolution data or also referred to as non-linear output data 310, for example.

Figure 6:
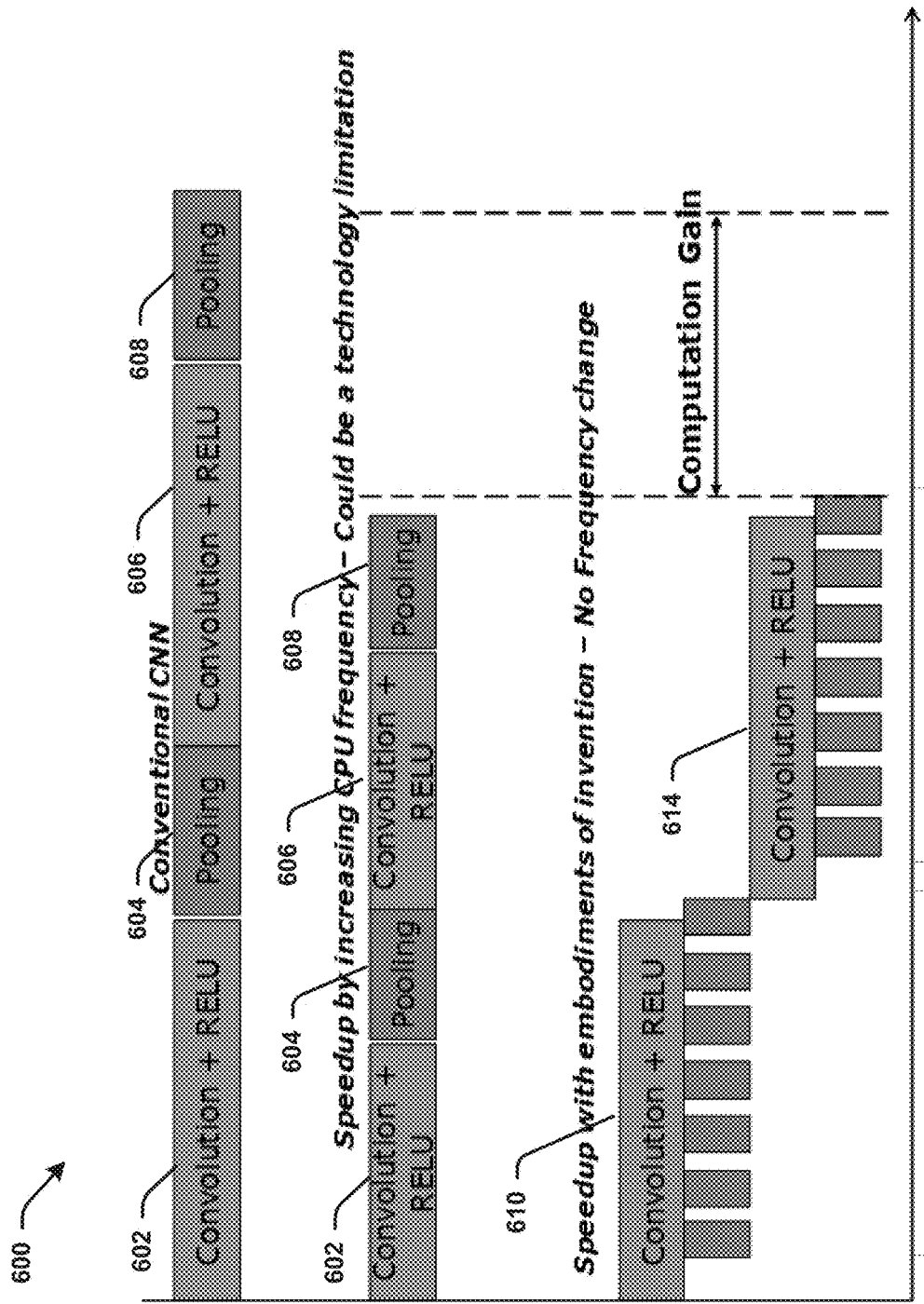
FIG. 6 illustrates chronographs of execution of certain components of the CNN according to various aspects described.

Referring to FIG. 6, illustrated are additional examples of CNN operations 600. The combined convolution+RELU layer 230 can be represented here as the combined layer 602. Generally, a pooling component 604 would normally only initiate upon completion of all convolution computations are completed. After completion of operations of the pooling component 604, further operations of a combined layer 606 can initiate, which can include further filters and feature maps from the layer 602 (i.e., for different features) or the same ones on different image data along the entirety of the image. Subsequently, the pooling component 608 or the same pooling component 604 can initiate processing on the data results. However, these operations between the combined layer 602/606 and a pooling component 604/608 are sequential to one another in time, with each component initiating only after all computation of a component ceases for a particular filter, feature map, and on a complete image analysis for the corresponding component without pipeline processing.

Then in the middle of FIG. 6, under the heading "Speedup by increasing control processor unit (CPU) frequency", the size of these windows or areas corresponding to each computational layer can be smaller. This is a speed-up representation of what can be achieved by increasing the CPU frequency, so when the processors operate at higher speed, they compute faster, leading to computation speed gain. Increasing the frequency is not a requisite and can have ramifications, with probably the biggest ramification related to excess power consumption, for example.

A similar or substantial computational gain can be configured via the pipeline processing of the pooling components 216 in parallel with, and triggered by, the convolution components 212 completing a given block/subset/portion of data from the convolution sliding window operations. The pooling components 216 can thus be interspersed with the convolution operations of the convolution components 212. As soon as the convolution outputs one block of data 310, which could be A, B, I, J, for example, or other data set (with a same or different window), and as soon as the last value J is returned, pooling operations can initiate. Thus, while the pooling operation is being performed on A, B, I, J, for example, the convolution has not stopped, but continues with outputting another data set such as C, D, K, and L. Once C, D, K, L is available, for example, the next round of pooling, via another pooling component, or the same pooling component 216, can start immediately, and likewise with further iterations, for example. This means that without increasing the CPU frequency and without incurring more power consumption, the same levels of acceleration can be achieved as if there was only an increase in the CPU frequency.

The speed-up from pipelining operations with the convolution layer 230 and the pooling layer 206 can be done by utilizing dataflow processing with data flow processor components over or instead of control flow processors. In general, control flow processors consist of Von-Neumann machines or as computing devices (control flow processors) with a program that resides in a memory, which can be a separate unit from a computing device. Additionally, Von-Neumann machines include a program counter which tells the control flow processor (or computing device) that it must now execute instructions at an address that is contained in the program counter. Then, the particular processor locates the memory location as designated by the program counter, fetches and brings instruction inside the processor and finally executes it. The program counter is incremented and then the aforementioned sequence repeats all over again as part of the normal operation for a control flow processor.

Figure 7:
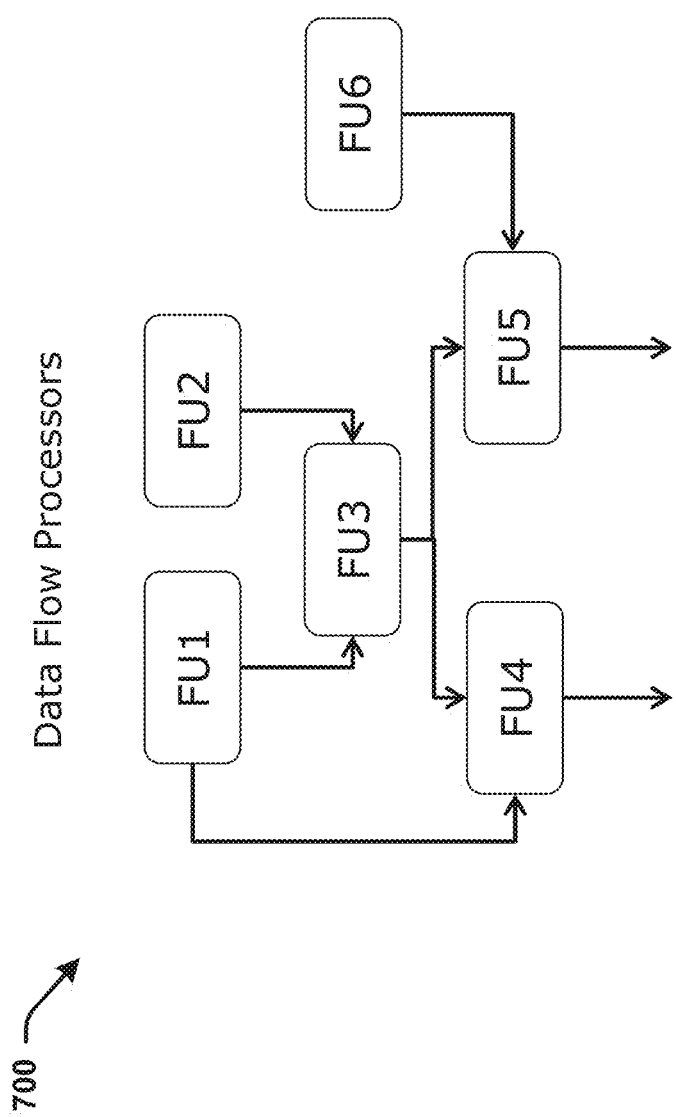
FIG. 7 is a block diagram illustrating data flow processors for components of the CNN according to various aspects described.

In contrast to control flow processors, or Von-Neumann machines, FIG. 7 illustrates an operational flow example 700 of dataflow processors (FU1-FU6) utilized as pooling components 216 or other components of the CNN system 104. Dataflow processors can be different from Von-Neumann machines in the sense that the instructions are not fetched from a memory. The instructions are already available inside the computing device. In particular, the instruction on a dataflow processor execute if the data required by the instruction is available, until that time nothing happens.

For example, the blocks annotated with FU1 through FU6 can be instructions that are already hardwired into a component. In particular, the two lines/terminals coming out of FU1 and FU2 and terminating into FU3 serve as input terminals for the latter. The output of FU3, for example, can also be connected to FU4 and FU5. These boxes can be instructions and the values coming into each FU box (dataflow processor element) can be the operands or input data, and the lines going out of the blocks can be output data or the result of execution of an instruction/operand. Consequently, as with each dataflow processor element, FU3 will not execute until both FU1 and FU2 have produced outputs. Similarly, FU4 will execute once it has received the outputs of FU3 and FU1, and FU5 until receiving the inputs of FU3 and FU6. So that the dataflow processors execute an instruction already hardwired based on, or in response to, the immediate availability of data only from one node to another. As such, instructions can be replaced with functional units or simple hardware units. Each FU can operate as a node that only fires only after it has received data made available at each input.

Figure 8:
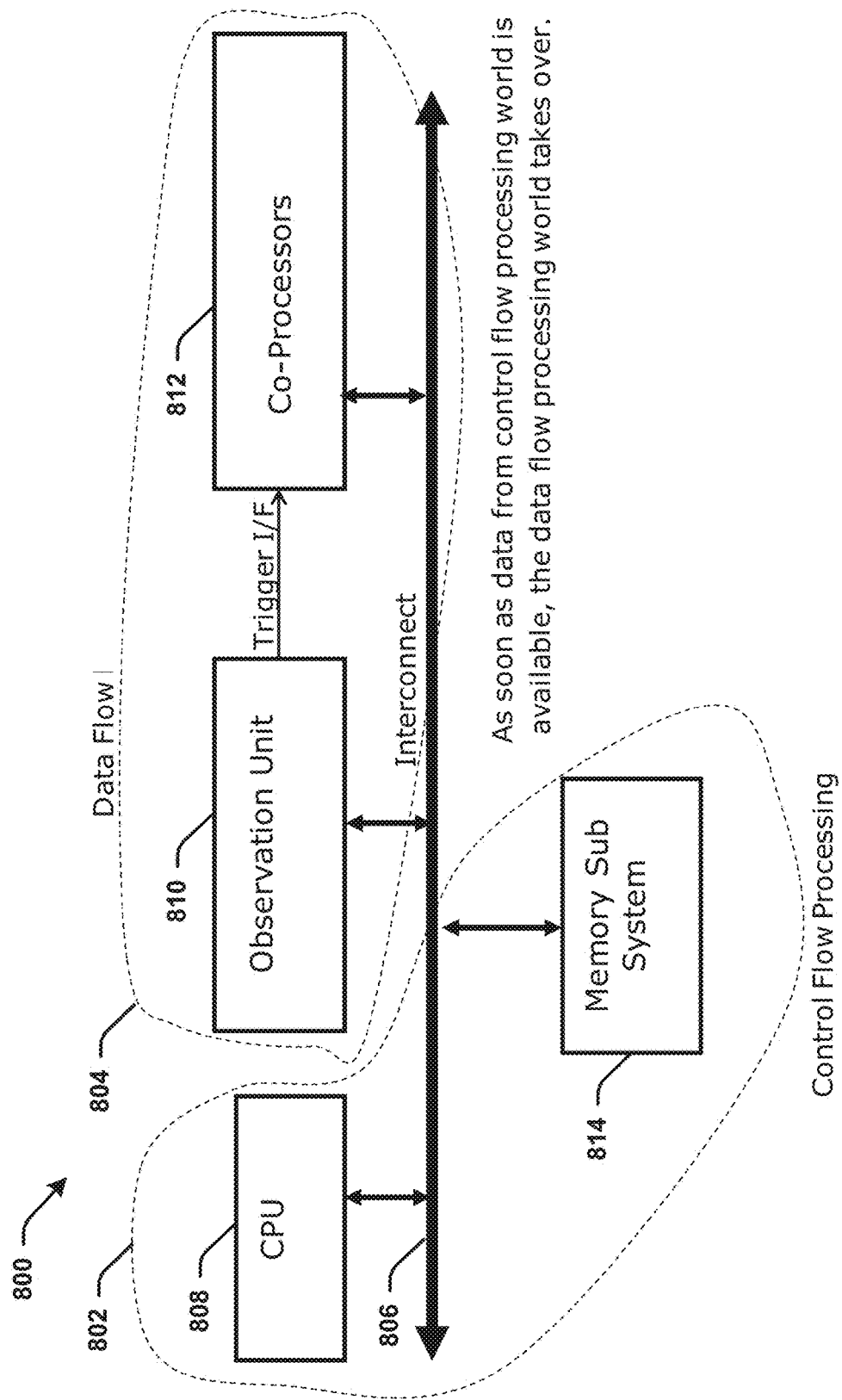
FIG. 8 is a block diagram illustrating a partition between control flow and data flow processing engines according to various aspects described.

Referring now to FIG. 8, illustrated is an example of an architectural CNN system 800 for operating the CNN layers in accordance with various aspects or embodiments. The system 800 includes control flow processing partition 802 by which components (e.g., Von-Neumann processor(s)) can operate with control flow processors and a data flow processing partition 804 by which components can operate with dataflow processors (e.g., FU1-FU6, or other components as described in FIGs and herein this disclosure).

A processor interconnect 806 can operate to connect various components, including a CPU 808 (e.g., a main processor or other Von-Neumann processor) and a memory 814 as part of the control flow processing partition 802, as well as an observation unit 810 and one or more co-processors 812 as data flow processor components of the data flow processing partition 804.

In an aspect, the components of the data flow processing partition can operate to support or comprise the pooling components 216 of the pooling layer 206 and the FC components 218 of the FC layer 208 for pipeline processing. The pooling operations can begin as soon as the convolution layer 202, 204, or 230 outputs a one block data (e.g., a 2×2 data window or other sized block of a non-overlapping data window). The observation component/unit 810 can be configured to determine this event, where a block of data is available at a location in memory. As soon as the observational unit determines that a final data of a block of data (e.g., J, from block A, B, I, J) is written to a particular memory address, the observational unit 810 can detect this event and provide a trigger to the co-processors 812 over an interface (I/F) to the coprocessors 812 comprising pooling components (e.g., pooling components 216) to operate in parallel with the convolutional layer 230.

Figure 9:
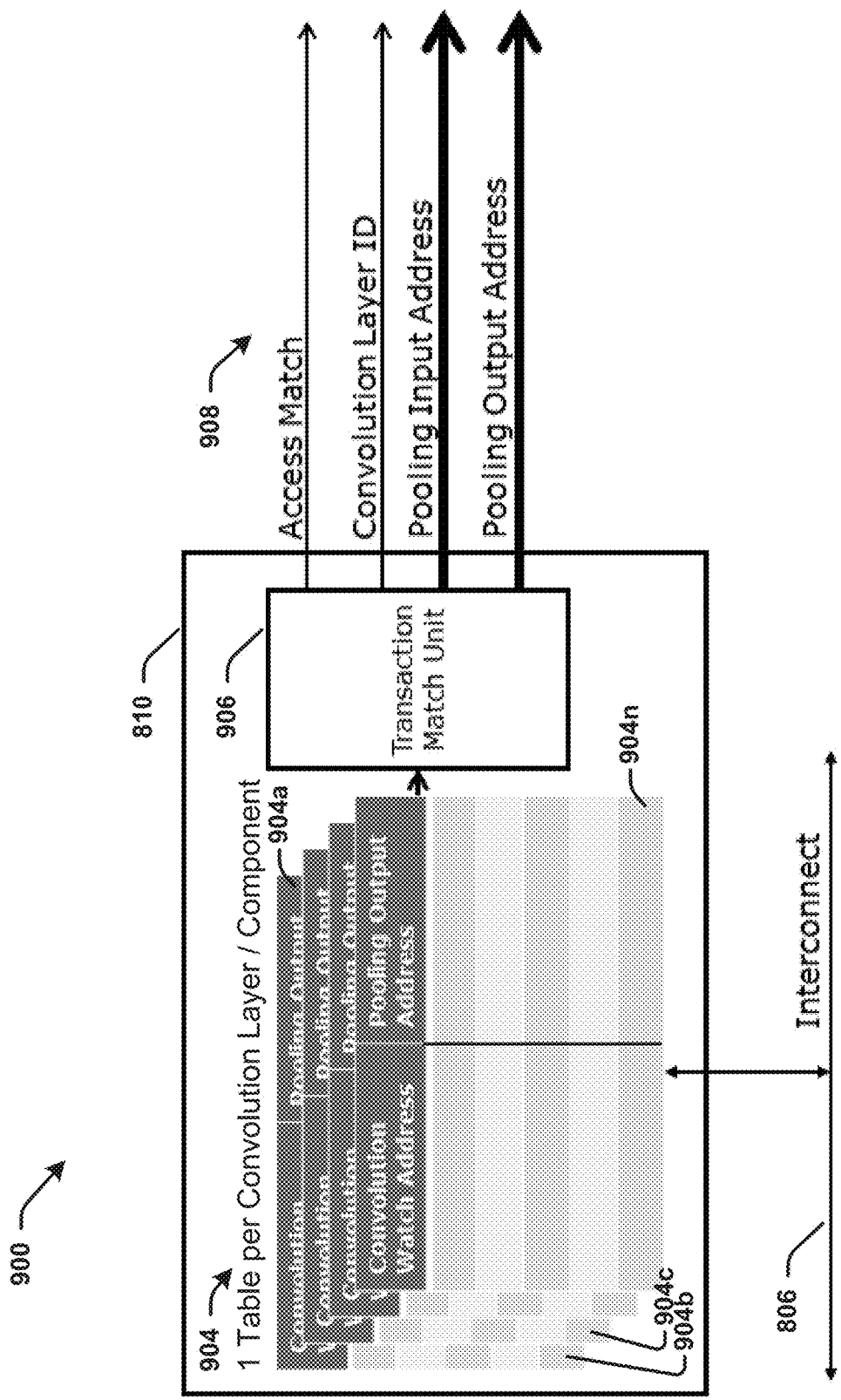
FIG. 9 is a block diagram illustrating an observation unit component of the CNN according to various aspects described.

Referring to FIG. 9, illustrated is an example of a convolution layer watch table 900 in accordance with various aspects/embodiments. The observational unit 810 can include a number of tables 904a-904n corresponding to convolution components 212 of convolution layer 202, RELU components 214 of RELU layer 204, or components 212, 214 of the combined layer 230, for example. Each of the tables 904a through 904n (n being any positive integer) can include a convolution watch address portion and a pooling output address portion corresponding to an address of the convolution sliding outputs 310 associated with each convolution/RELU component 212, 214. A transaction match unit 906 can be a component of the observation unit 810 that generates trigger in response to a particular location of data being written to in the table 904-904n, for example. Outputs 908 can be provided to any of the co-processors 812 for processing, which, for example, can be pooling components 216 designating for pooling operations at least in part as well as FC components 218 discussed in further detail infra with respect to FIGS. 12-15, for example.

Figure 5:
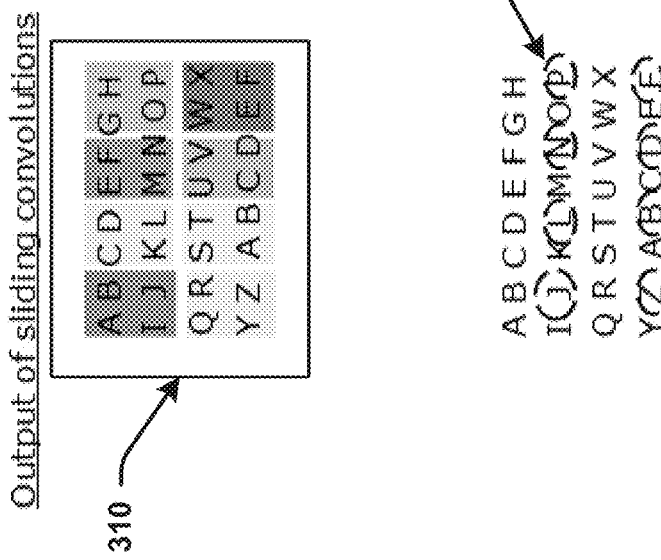
FIG. 5 illustrates another diagram of aspects of convolution and pooling operations according to various aspects described.

A convolution watch address can be the addresses 502 of the outputs of the sliding convolutions 310 of FIG. 5 (e.g., J, L, N, P, Z, B, D, and F) as stored in a table 904 that is assigned and corresponding to the particular convolution/RELU component 212, 214 of the combined layer 230. These are convolution output addresses that the observational unit 810 monitors and can be written into column 1 of the corresponding table 904 by a convolution component 212, RELU component 214, or other component, for example, in response to a convolution sliding window generating a set of convolution data or extracted results.

At each convolution watch address there can be a corresponding pooling output address associated with the pooling outputs 402 of FIG. 4, for example. The address locations (pooling output addresses) of the pooling outputs 402 (e.g., B, K, E, P, Z, A, U, X) can be the pooling addresses corresponding to a designated pooling component 216 associated with the particular table (e.g., 904a, or other table). The pooling output address of the outputs 908 can include the memory locations where the corresponding pooling component 216 of the layer 206 can write its output to.

Once the observational unit 810, including the tables 904 and transaction match unit component 906, detects that one of these convolution outputs 310 is available, or as soon as the observational unit 810 detects that the convolution watch address of the memory location corresponding to one of the convolution outputs has been written to, the observation(al) unit 810, via the transaction match unit component 906, can instantly generate a trigger (as the access match output) of outputs 908 to a corresponding pooling component 216 as the co-processor 812, for example. The access match output 908 indicates that the convolution/combined component 212, 214 has completed its job with a convolution sliding window on a particular block of data (e.g., a single 2×2 block of nonlinear convolution output data/convolution component outputs). The access match can be the trigger provided to the pooling component 216 corresponding with the particular table 904a-904n indicating that when the corresponding table 904 has been written to and that the last element of a particular block size (as a non-overlapping block of convolution output data/nonlinear convolution output data) is available, and thus, be an indication signal to perform pooling operations with the available block of data. As such, the access match can be the trigger signal/indication/event that initiates the corresponding pooling component 216 to begin generating pooling outputs as scaled invariant data with the data available.

In addition, the observational unit 810 indicates, via the transactional match unit component 906, details of a pooling window, including the table corresponding to the memory location that has been written to via the convolution layer identity (ID)/convolution component ID so that the pooling component 216 corresponding to this ID activates accordingly and receives the corresponding data (convolution watch address/pooling output address) for pooling operations in the particular table 904. Because multiple convolution components correspond respectively to each table, and likewise, multiple pooling components correspond respectively to various convolution components/combined layers (convolution component plus a RELU component), the pooling components 216 can be provided with information about which of the various convolution components is responsible for the trigger. Then the pooling output address can be utilized by a pooling component 216 for writing the scaled invariant data.

Figure 10:
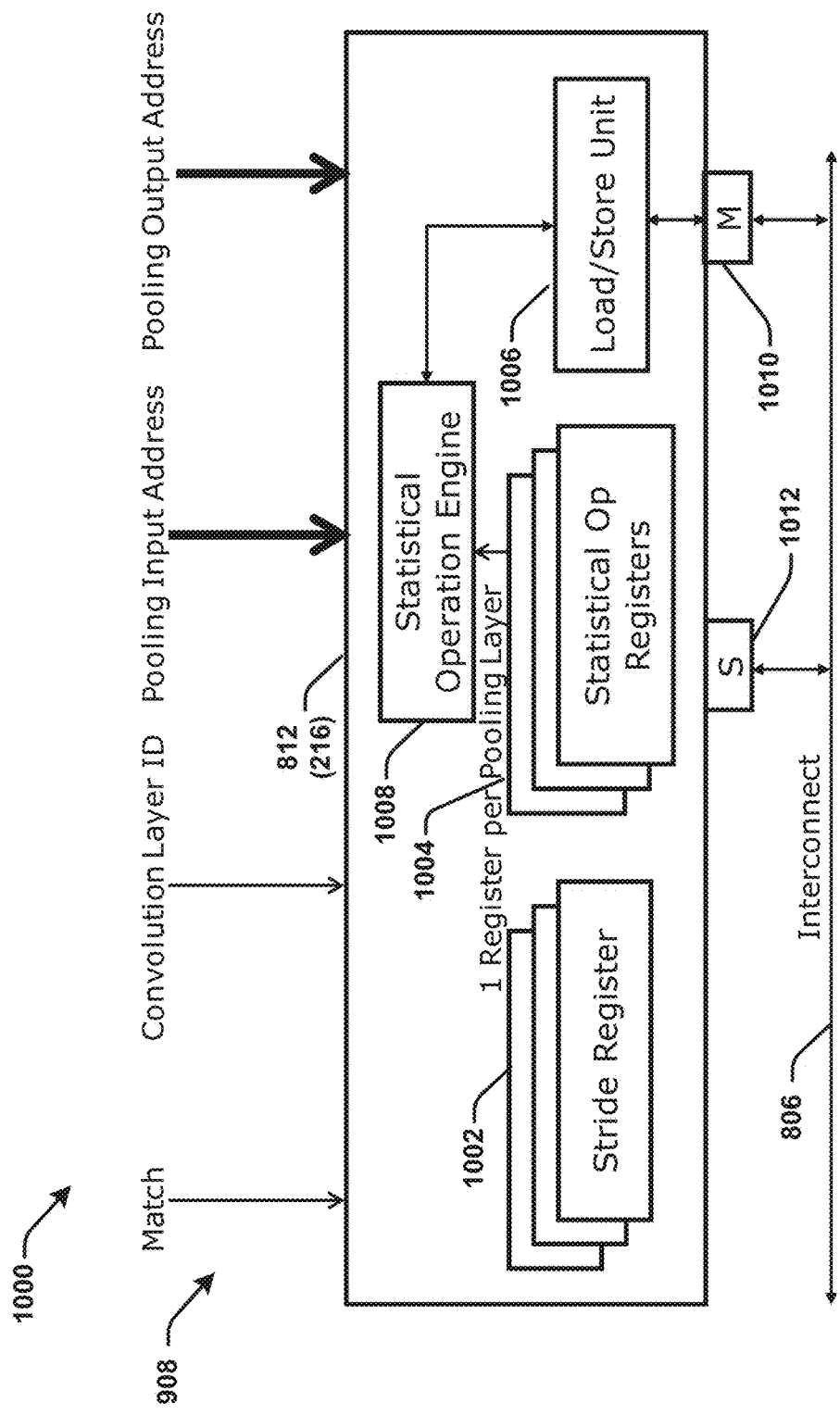
FIG. 10 is a block diagram illustrating a co-processor or a component architecture for the CNN according to various aspects described.

Referring to FIG. 10, illustrated is an example pooling component 216 or co-processor 812 as a pooling processor of a CNN. The pooling component 216 can include one or more stride registers 1002, one or more statistical operation (Op) registers 1004, a load/store unit 1006 and a statistical operation engine 1008. The co-processor 812 as a whole receives the interface signals from the corresponding table 904 as pooling window details, namely the pooling input address, the pooling output address, convolution layer ID, and the match signal as outputs 908 via the corresponding table 904 (e.g., any one of tables 904a-904n).

Each of the pooling components 216 can comprise two registers, the stride register 1002 and the statistical operation registers 1004. The stride registers 1002 enable a location distance to be given between non-contiguous data or data sets in memory, which can be utilized in order for the data to be retrieved and processed.

For example, specifically for the first window of convolution outputs 310 A, B, I, and J, various values of the convolution outputs/nonlinear convolution output data can be stored with A at memory location 10, B at memory location 11, C at 12, D at 13, E at 14, F at 15, G at 16, H at 17, with I at 18, and J at 19, for example. As such, A, B, I, and J (i.e., output of sliding convolution window/pooling layer inputs) are not exactly at contiguous locations. A and B are simply existing adjacent to one another. I and J could be next to one another, for example, but then A and B are not adjacent to I and J. Therefore, the stride registers 1002 retrieve, store or indicate to the coprocessor 812/pooling component 216 the non-contiguous distance from B to I as the stride length/distance.

As soon as a trigger is received in the form of the access match signal, the pooling component 216 can determine the convolution component/layer ID and whether the convolution layer ID corresponds to itself or a certain pooling component 216. In one aspect, there can be a one-to-one mapping between pooling components 216 and convolution/RELU components 212/214. Thus, if there are twenty combined layers 230, there can be the same number of corresponding pooling components 216, for example. As such, as soon as the identification of the convolution layer is available, the corresponding pooling component 216 identifies the stride length via a stride register 1002, and the pooling component 216 knows where to stop, namely the convolution watch address (the last address of a data that is a final data of a non-overlapping window of convolution output data/nonlinear convolution output data).

The load store unit 1006 is configured as a memory access unit that can use the stride information from the stride register 1002 and provide A, B, I, and J or the block of convolution output data/nonlinear convolution output data into the statistical operation engine 1008, which is configured to perform the statistical operation on the four elements of data (e.g., 2×2 non-overlapping block) that is specified in the corresponding statistical operation register 1008. The statistical operation, for example, can be a maximum and be the same operation or different, as specified herein, depending on the corresponding match between convolution layer 230 components and the pooling component 216. Once the statistical operation is performed, the output value can be stored at an address indicated by the pooling output address in the corresponding table (e.g., 904*a*) and there is a storing of data into the memory location again done by the load store unit 1006.

The interconnect 806 can comprise interconnects (e.g., on chip bus interconnects) that connect the various components of the CNN. The S port 1012 is a slave port and the M port 1010 is a master port. The slave port 1012 can be used to program the stride register 1002 and the statistical operation registers 1004, for example. The master port 1010 can be used by the load store unit 1006 to fetch data from memory and store data back in a memory, for example.

Figure 11:
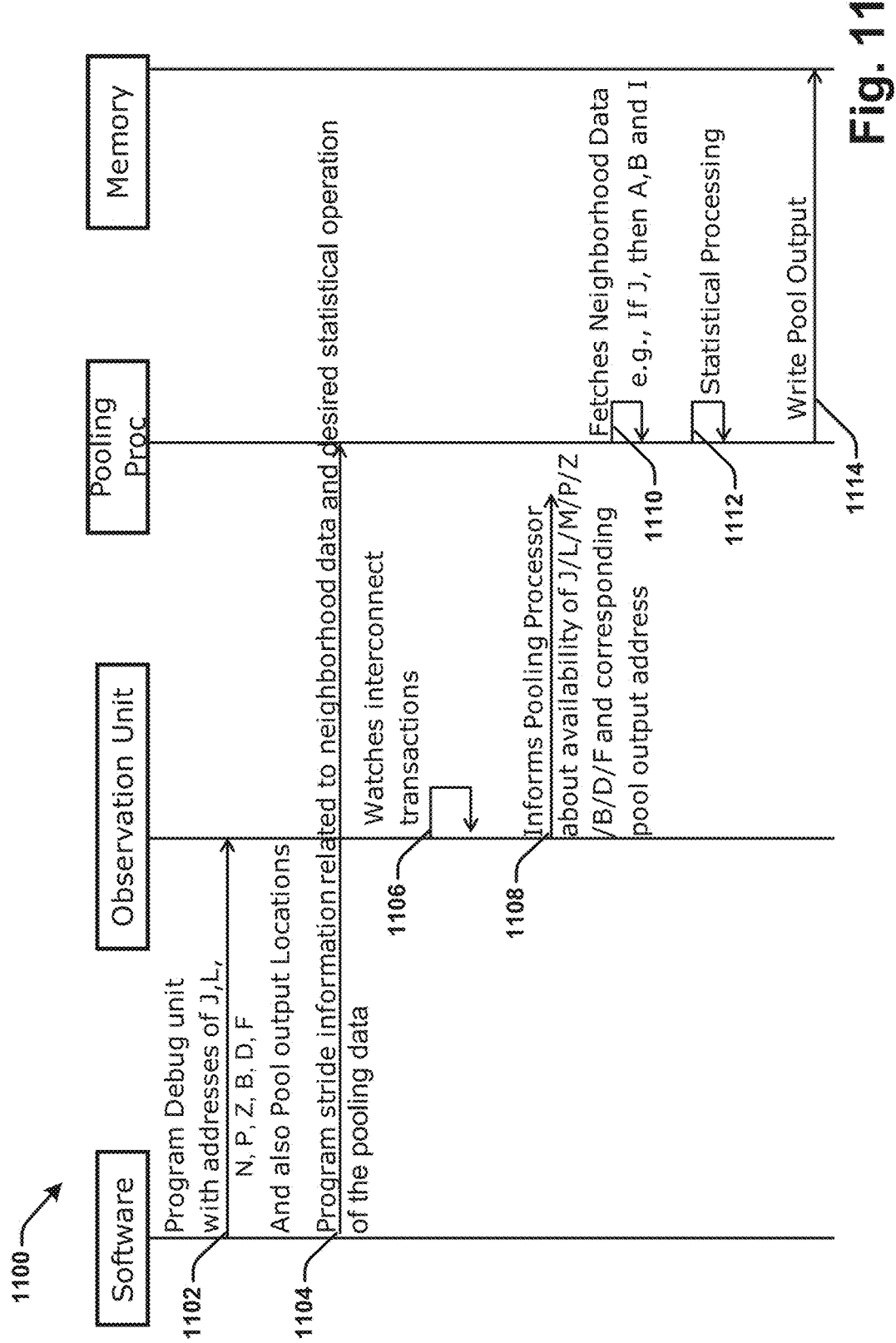
FIG. 11 is a flow diagram illustrating a process flow according to various aspects described.

Referring to FIG. 11, illustrated is an example process or state flow 1100. Aspects of the various CNN layers are represented, involving software on a main CPU 808, the observation unit with tables 904, as well as pooling components 216 or other components connected thereto, and the registers 904, 1002, 1004/memory 814 from which the convolution data output could be fetched/stored and possibly the same/different memory into which the output of the pooling layer could be returned to. The process flow 1100 initiates with software running on the main CPU 808 of FIG. 8 that programs the tables 904 or other tables described herein.

At 1102, table 904*a* can be populated in the debug/observation unit with addresses of J, L, N, P, Z, E, B, D, F, for example, as the last values of corresponding non-overlapping blocks of data (e.g., the outputs of convolution of a 2×2 block resulting from convolution sliding window operations).

Afterwards at 1104, the pooling processor can be programmed with parameters for pooling operations to be subsequently performed, such as the stride information or the stride and the statistical operation.

At 1106, the convolution layer can operate with the main processor 808 and the observation unit monitors for an access or a write access to be made to an address where the output of the convolution is meant to be stored. As soon as this happens, the debug/observation unit 810 informs the pooling component/processor (proc) 216 about availability of a block of data.

At 1108, upon the detection of a write access to a memory location specified in table 904, the output signals 908 can be updated retrieving details from the table 904 and forwarded to the pooling components 216.

At 1110, the pooling component 216 can fetch the neighborhood data and in this example if the observation(al) unit has indicated that there was an update made to J, the address location of J, for example, then the pooling component 216 knows that it must fetch A, B and I, or the data of the corresponding associated block of data to complete the 2×2 block (or other sized non-overlapping block). Then once all 4 of them are available, at 1112 it rapidly does the statistical processing. Then at 1114 the output is returned to a memory location determined by the pooling output address in the table that is designated or associated with this pooling component 216.

As discussed above with respect to FIG. 2 and other Figures herein, convolution and pooling components 212/214 and 216 can be pipelined (or utilized with pipeline processing) in parallel as a first speed up in computational gain and lower/same power efficiency that is observed. As soon as a partial/subset of convolution outputs is detected, a pooling component 216 can initiate while the same or other convolution/RELU components 212, 214 process and begin outputting other windows of data blocks.

Figure 12:
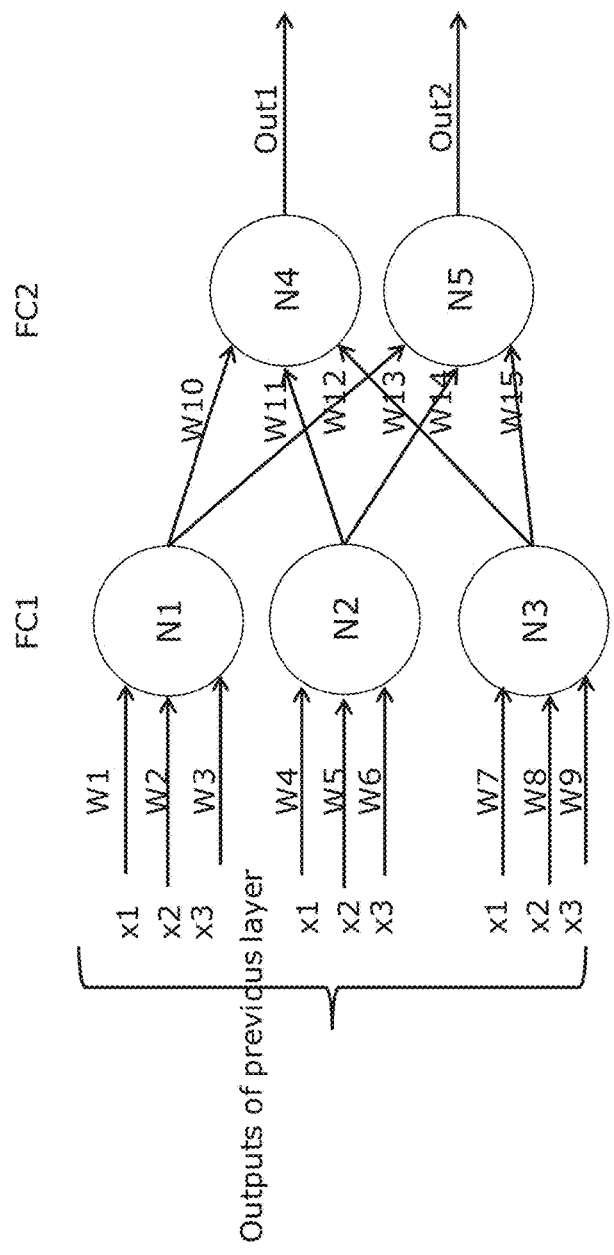
FIG. 12 is a block diagram illustrating a fully connected (FC) layer of the CNN according to various aspects described.

Referring to FIG. 12, illustrated is an example of the FC components 218 of the FC layer 208. This demonstrates the second speed up in the FC layer 208 that can occur in order to further increase computational gain without increasing power that further compliments the first speed up with pipeline processing operations between the convolution components 212/combined components 230 (convolution 212+RELU components 214 and the pooling components 216). The FC layer 1200 illustrates the speed up of the fully connected layer.

Each neuron forming an ANN in the FC layer 208 can be represented by the circles labeled N1, N2, N3 in a first FC layer FC1 and N4 and N5 as part of a second FC layer FC2. N4 and N5 are connected with each of the outputs of the preceding layer, which is N1, N2 and N3 as represented. Thus, the output of N1 is provided as inputs going to both N4 and N5. Similarly, the output of N2 is going to both N4 and N5, and the same with N3. Similarly, all three neurons, N1, N2, and N3 are connected to the same set of inputs X1, X2 and X3, and are structured as data flow processors. It is the same set of inputs X1, X2 and X3 that are fed to N1, N2, and N3. As such, in the fully connected layer 218 the output of a neuron goes to every input in the next layer, which can comprise any number of a plurality of FC layers. Additionally, all the neurons of FC1 are connected to all the inputs of FC2, in which W1-W15 represent the particular weight assigned or defining the amount each input is to be weighed as part of processing or factoring of the corresponding input data.

Figure 13:
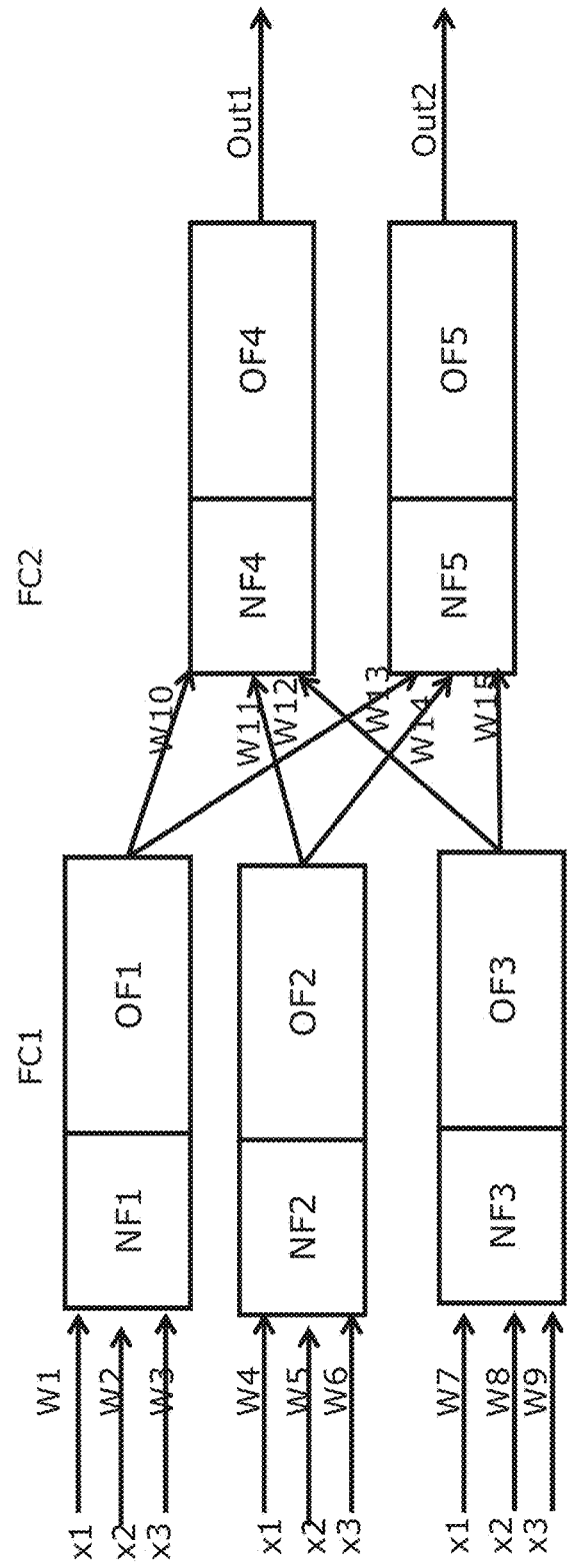
FIG. 13 is another block diagram illustrating a fully connected (FC) layer of the CNN according to various aspects described.

Referring to FIG. 13, illustrated is another embodiment in more detail of the net functions 222, 226 and output functions 224, 228 of the neuron structures of FIG. 2, for example.

As discussed above with respect to the neuron structure of FIG. 2, each neuron can comprise at least two functions. One function can be referred to as a net function, annotated as NF and the other as an output function, annotated as OF. The mathematical operation performed by the net function can be a dot product multiplication of an input with its assigned/predefined/given weight.

For example, the functions of N1 are annotated as NF1 and OF1. Similarly, the net function and output function of neuron 2 is annotated as NF2 and OF2, and similarly with neurons N3 through N5 with NF3 through NF5 and OF3 through OF5, respectively. Each one of the neurons of a particular FC layer (e.g., FC1, FC2) have net functions that receive the same exact set of inputs as the other, but with different or varying weights associated with their respective inputs, such as W1, W2, W3 for N1 and other weights that are different for the other neurons—W4, W5, W6 for neuron 2 and W7, W8, W9 for N3. Each net function of a neuron (or FC component 218) can perform a mathematical operation that multiplies the weight with the input that is appearing (e.g., x1 multiplied by W1, added to x2 multiplied by W2, and added to x3 multiplied by W3, and so on for the other neurons N2, and N3), as represented by the following: Net Function=xa.(Wa)+xb.(Wb)+. . . +xm.(Wm).

Additionally, the output function of each neuron can take the output of the net function, so the output of a net function serves as inputs to the output function of the neuron. So the output function (OF) of each neuron can perform a known mathematical functionality (e.g., a sigmoid, a hyperbolic tan, a sign, etc. or other mathematical function) on the output of the net function, and then that becomes the input to the next stage neuron at FC2 and so on depending on any number of multiple FC layers, for example.

Figure 14:
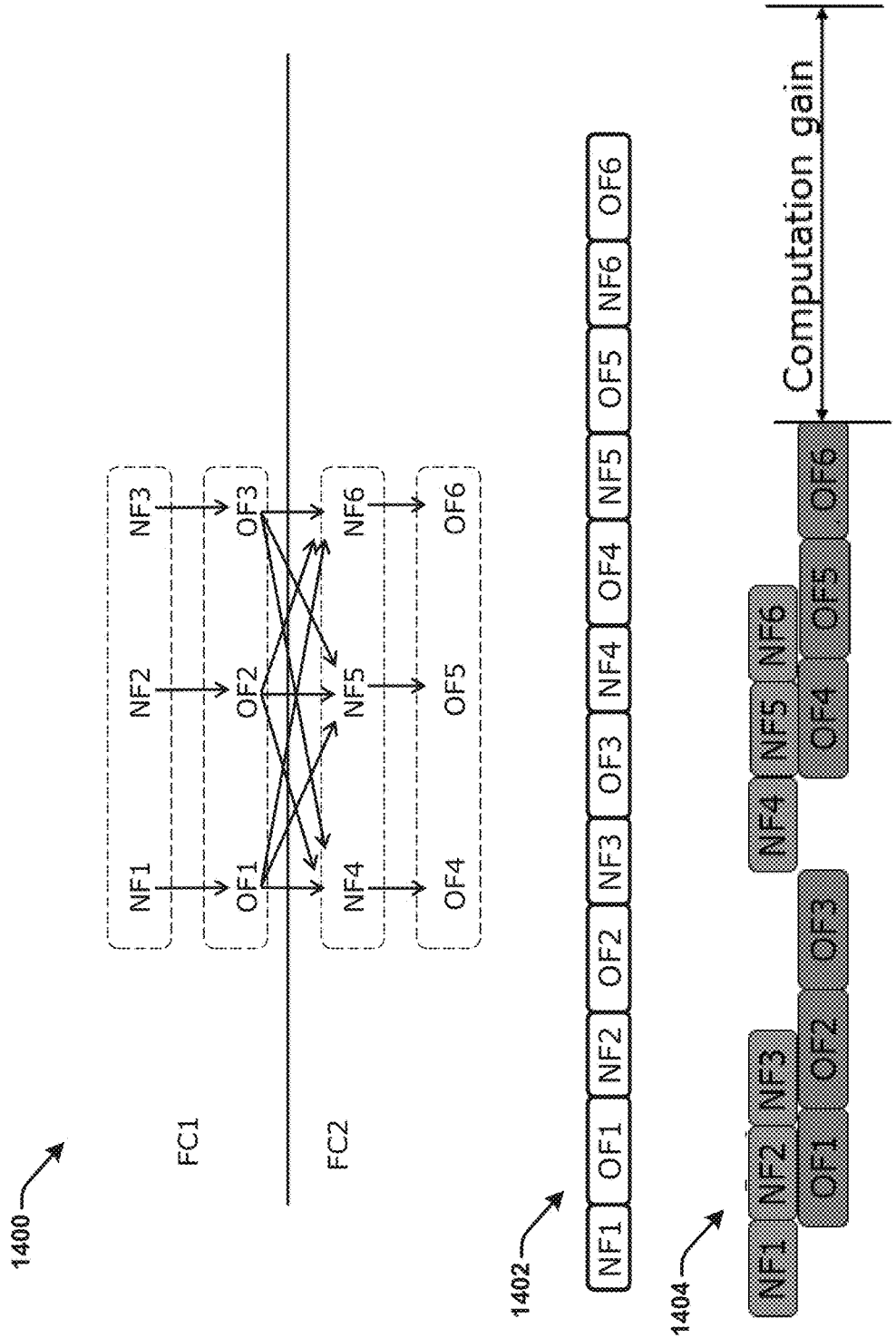
FIG. 14 is another block diagram illustrating a fully connected (FC) layer of the CNN according to various aspects described.

Referring to FIG. 14, illustrated is a data dependency graph 1400 of the FC layer 1300 of FIG. 13, which is similar to or the same in detail of FC layer 208 of FIG. 2, as a further representation. In the first stage of the FC1, NF1, NF2 and NF3 are lined up next to each other with OF1, OF2, and OF3 lined up again underneath in the same FC1. For example, NF1 terminates at OF1, NF2 terminates at to or connects its output at OF2, and NF3 with OF3. Similar to the data flow processors/processing, the line or arrow demonstrates that OF1 will not start its execution until it has received its data from NF1. Processing at each OF is initiated in response to data availability at the inputs. Similarly, OF2 does not start execution unless it has received data from NF2. Additionally, OF3 does not start execution until data from NF3 has been received.

In the next stage of FC2, multiple connections (arrows) are terminating at NF4, for example, as the outputs of the output functions of the previous layer FC1. Likewise, each of the neurons in a fully connected layer 208 are connected to every output of the previous layer. Thus, the operation of NF4 is dependent on availability of the outputs of OF1 through OF3 being provided at the inputs of NF4, the operation of NF5 is dependent on the availability of outputs of OF1 through OF3 being provided at the inputs of NF5, and is the same case with NF6. FIG. 14 is similar to FIG. 13 in a different representation that is slightly more expanded. Any number of the FC layers can be implemented with any number of FC components at each stage or layer forming an ANN or artificial neural network. As soon as NF4 receives the dependent data from OF1-3, it produces an output that goes to OF4, and only then OF4 produces its result. This is data flow processing.

FIG. 14 further demonstrates a chronograph of execution 1402 in such a way that NF1 is executing and as soon as that function NF1 executes it is succeeded by OF1. Afterwards, NF2 executes, OF2 executes, then NF3 executes and then OF3 executes sequentially. For example, it is only when OF1, OF2, and OF3 executes that OF4 executes. As such, it is only after NF4 is available that the output of OF4 is produced.

In an embodiment, with the chronograph of execution 1404, the FC layer 208 can also operate with pipeline processing so that as soon as NF1 completes its computation, OF1 initiates executing and it is triggered by the availability of its input data. While OF1 is executing, nothing precludes the execution of NF2 and therefore its execution is also initiated in parallel to execution of OF1. As compared to the previous chronograph of execution 1402 where NF2 followed NF1, while OF1 is executing, components and techniques can be utilized to execute NF2, so the execution of NF2 and OF1 are overlapping. Thus, OF6 can finish much greater time with a computation gain increase.

Figure 15:
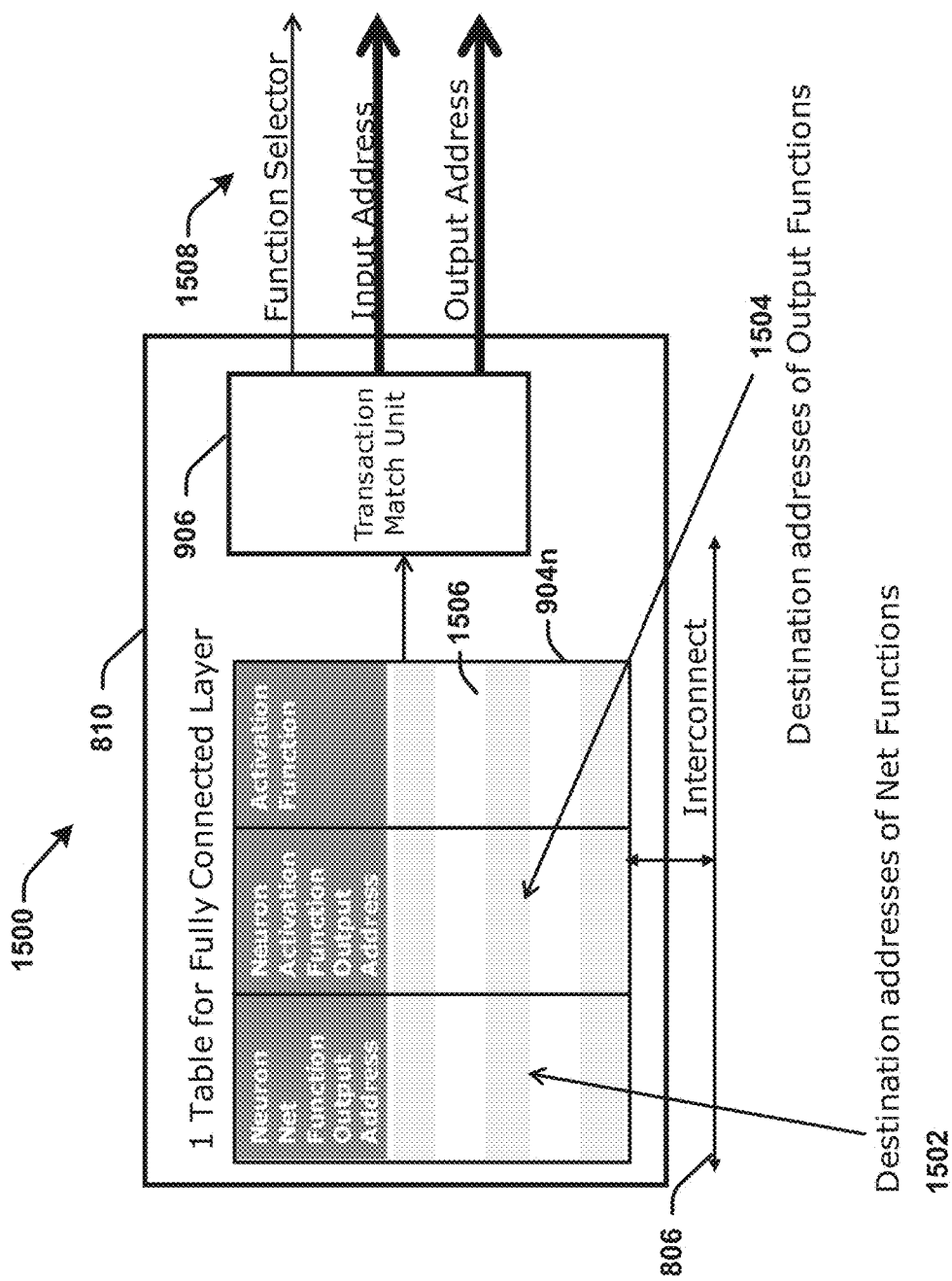
FIG. 15 is a block diagram illustrating details of an observation unit component of the CNN according to various aspects described.

Referring now to FIG. 15, illustrated is another aspect 1500 of the observation(al) unit component 810 to enable pipeline processing at the FC layer 208. At least one table (e.g., 1510, where n is any integer) of the tables 904 can comprise a different table than the others as a further extension to enable pipeline processing at the FC layer 208 with the observational unit component 810. These tables 904, including 1510 can operate in conjunction with the FC components 208 of the FC layer 218 and the pooling outputs of the pooling components 216 initially being received at the inputs of FC1, for example. It is one table 1510 dedicated or assigned for the FC layer 208 and the FC components 216.

The table 1510 comprises three columns, namely a destination addresses of neuron net functions column 1502, a destination addresses of neuron output functions 1504, and an activation function 1506. In one example, if NF1 at FIG. 13 is executing and it does all the multiplication and additions. Suppose it can submit its output to OF1, then NF1 would have to write its output to a certain memory location and that memory location is what is going into the first column 1502 (the neuron net function output address). Then this data, the data produced by NF1, is accepted by its output function OF1. The processing of output of NF1 is done and then OF1 will have to write its output somewhere, which is basically the addresses in the neuron activation function output address column 1504.

However, the output functions can now be executed by a special co-processor, which is informed about availability of data produced by the corresponding neuron net function by transaction match unit 906. In one specific example, the NF1 provides its data to OF1. Then OF1 computes its output and stores it at a location, where the output address of NF1 would be in the first column of a certain (e.g. first) row. In the next column 1504, the table 1510 manages or holds the output address of the output function OF1, and what must be done, or what kind of output function must be applied, sigmoid, tanh, sinusoid, etc., is what is described in the third column 1506 of the same row. Functions or each row can vary from one another or be similar. Thus, as soon as a Net Function (e.g., NF1) of a neuron writes to its output address, this operation is detected via the transaction match component 906 and the details of this operation are forwarded to a co-processor as an FC component via the outputs 1508.

The outputs 1508 comprise an input address and output address. The input address is basically the place where the net function wrote its output to. The output address is where the output function, which is the address of the output of the output function. The output function is executed by the activation function coprocessor of 812, for example. It has received the function selector as one of the inputs as a trigger indication/event that is forwarded by the transaction match unit 906 as part of the three pieces of information outputs 1508. These 3 pieces of information are coming from each cell of a row of table 1510 designated for the FC layer 208. The function selector is coming from the third column 1506, the input address is coming from the first column 1502, and the output address is being retrieved from the second column 1504.

Figure 16:
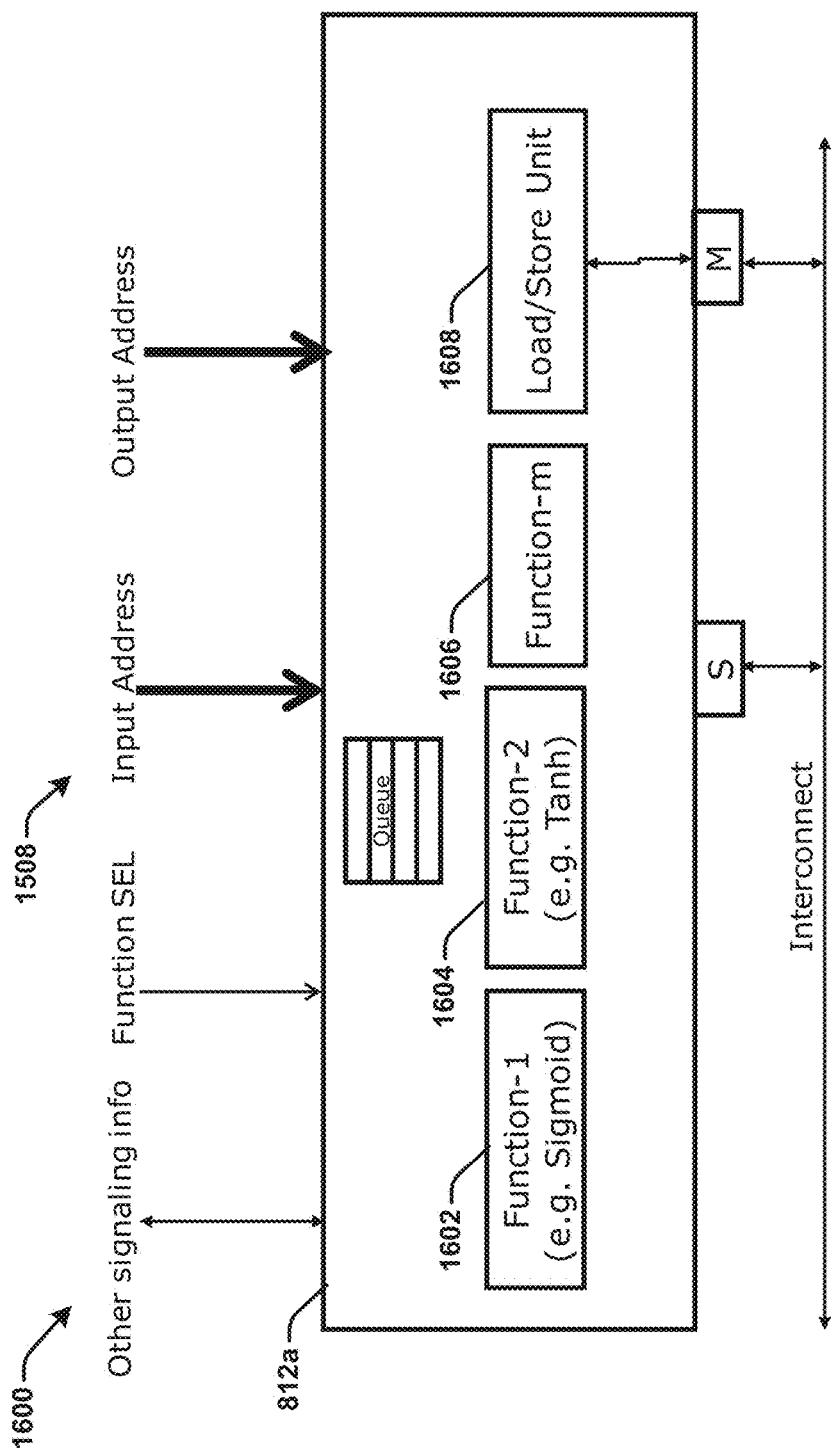
FIG. 16 is a block diagram illustrating a co-processor or a component architecture for the CNN according to various aspects described.

Referring to FIG. 16, illustrated is an example 1600 of an FC component 812a or a co-processor 812 of an OF component, for example, as a receiving component of the outputs 1508 of FIG. 15. The FC component 812a as one of the co-processors 812, for example, can be a receiving component that receives the outputs 1508. The FC component 812a or the same as an FC component 218 comprises a load store unit 1608 which through the interconnect master port M 1610 can obtain data from the memory location indicated by the input address, gets the data and then submits it to a piece of hardware, which is annotated as function-1 1602, or function-2 1604, or any number of components function-m 1606. Then the load/store unit 1608 knows which of these functions 1602 through 1606 to submit or process with this recently fetched data because that information is available on the interface or output/input called function selector (SEL). Once function-1 1602, function-2 1604 or otherwise 1606 has done its job processing according to a given function, then the data produced by that function (e.g., an operand or other processing/mathematical function) is stored into the memory location indicated by "output address" by the load store unit 1608.

As such, the net functions of the FC components described herein can be executed on the main CPU with the output functions that are implemented in the function coprocessor to overlap the execution of the net function and output function in pipeline processing. Together with the first speed up by pipeline processing the pooling components and the components of the combined layer 230, the CNN can operate with the ability to determine availability of a pooling window for further parallel processing. This includes the ability to start statistical operation on the pooling window in parallel to ongoing convolution and RELU operations via respective components. Further, in the second speed up for the CNN, there is the ability to determine completion of execution of a net function of a neuron/FC component, and the ability to start execution of activation function of the neuron overlapping with execution of net function of the next neuron.

Figure 17:
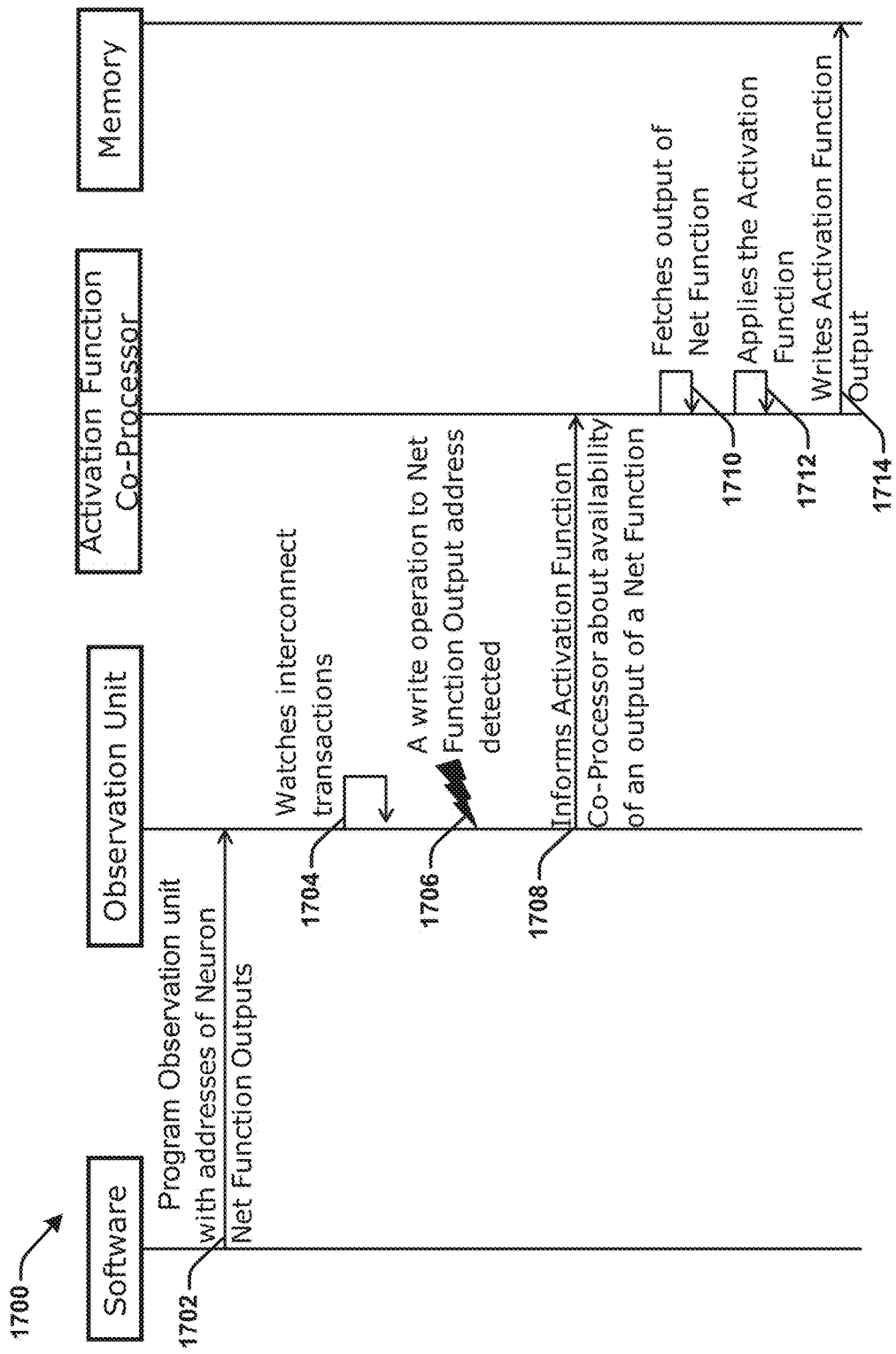
FIG. 17 is a flow diagram illustrating another process flow according to various aspects described.

Referring to FIG. 17, illustrated is an example process or state flow 1700 in the FC layer 208. Similar as in FIG. 11, the process flow can include software on a main CPU 808, the observation unit that has been enhanced with table 1510, as well as FC components 218 connected thereto as one or more activation function co-processors or the like, and the registers 904, 1002, 1004/memory 814 from which the convolution data output could be fetched and possibly the same/different memory into which the output of the pooling layer could be returned to.

The process flow 1700 initiates at 1702 with software running on the main CPU 808 of FIG. 8 that programs the table 1510 as a table of managed by the observation unit 810.

At 1704, the observation unit monitors the interconnect transactions to determine whether a net function has written to an address with a net function output. In response to a write function to an address, the observation unit detects this at 1706, and at 1708 informs the activation function co-processor or next FC component in the ANN about the availability of an output of a net function. At 1710, the activation function co-processor fetches the output of the net function, applies the activation function to the data at 1712, and writes the activation function output at 1714 to the memory, for example.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Figure 18:
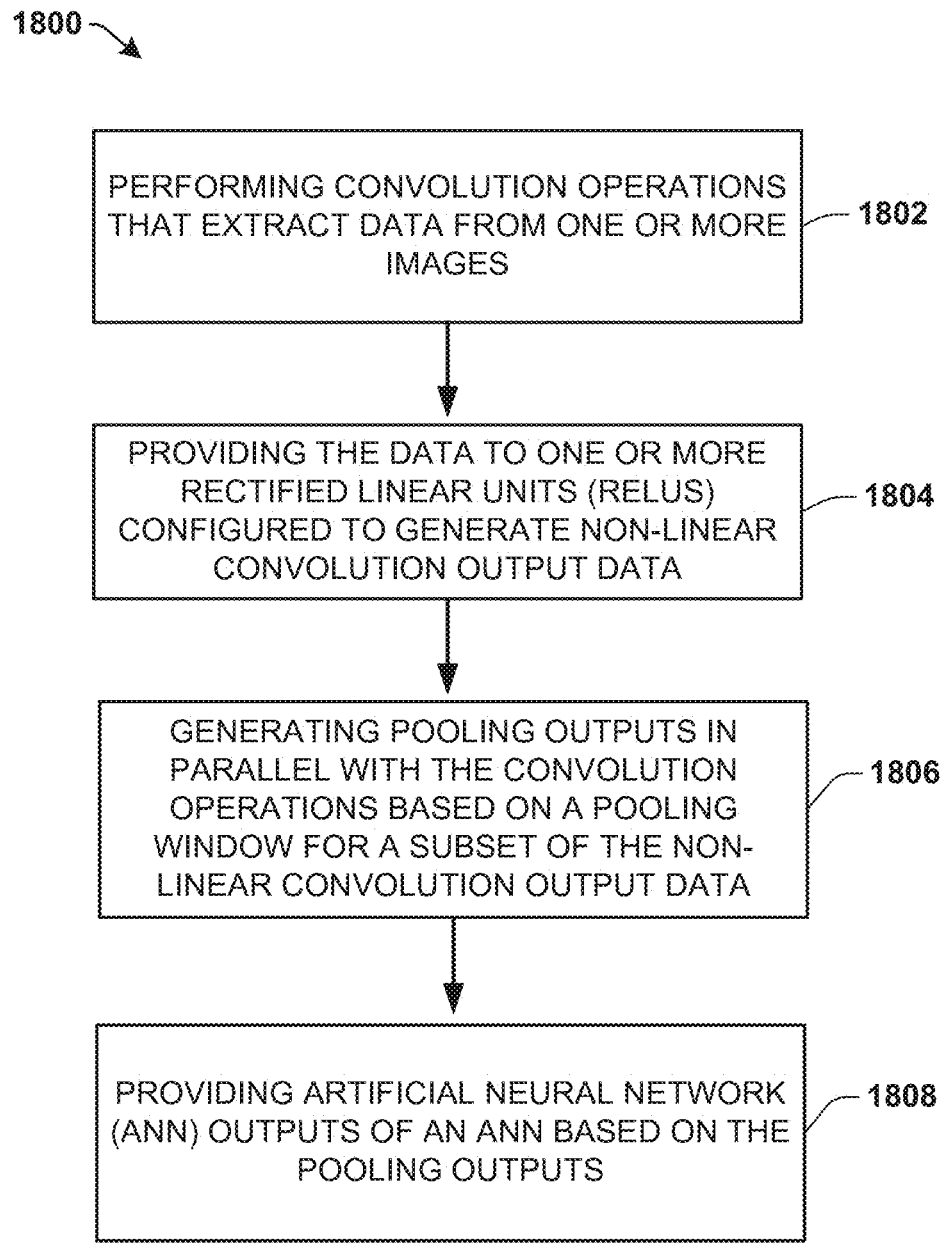
FIG. 18 is a flow diagram illustrating a process flow according to various aspects described.

With reference to FIG. 18, illustrated is a process flow 1800 for employing various speed ups with different pipeline processing in a CNN according to various aspects/ embodiments/details described in this disclosure. The method 1800 initiates at 1802 with performing, via one or more processors (e.g., convolution components 212), convolution operations that extract data from one or more images.

At 1804, the convolution components provide convolution data as data sets that can be hierarchical in detail to one or more rectified linear units (RELUs) 214, which then generate non-linear convolution output data as part of the convolution layer 202 or a combined layer 230

At 1806, a pooling component 216 can receive the data and a trigger of availability of a data window (e.g., a pooling window), which can be a non-overlapping window of data from the various data sets of non-linear convolution output data. The pooling component 216 can initiate pooling operations on the block of data in parallel with the convolution operations based on a pooling window that is a subset of the non-linear convolution output data and convolution data that is being generated over an image. The pooling component 216 is triggered by an availability of this window of data by the observation unit 810 and after processing writes output to memory.

In other embodiments, the method 1800 can further comprise providing, in a first fully connected FC layer of the ANN, first net function outputs of first net function nodes to first output function nodes. The first output function outputs of the first output function nodes can be then provided to second net function nodes of a succeeding FC layer that is configured to generate the ANN outputs. A completion of a first net function (e.g., NF1) can be determined by the observation component 810 and trigger a completion of a first net function of the first nodes to a subsequent layer where a second net function of the second nodes can be processed in parallel with a first output network node generating an output function of the first FC layer via pipeline processing.

At 1808, the method further includes providing artificial ANN outputs of an ANN based on the pooling outputs. The ANN outputs can be the outputs of the FC layer 208, which are further then used to be classified into probabilities, for example, for the recognition or determination of particular patterns/high level features within the images of sensor data. From the recognition of patterns, various conditions can also be determined and then decisions within a system to be made based on whether various conditions exist or not, such as braking if a pedestrian is in a driving path, or the like.

Applications (e.g., program modules) can include routines, programs, components, data structures, etc., that perform particular tasks or implement particular abstract data types. Moreover, those skilled in the art will appreciate that the operations disclosed can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of computer-readable media. Computer readable media can be any available media that can be accessed by the computer and includes both volatile and non-volatile media, removable and non-removable media. By way of example and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media (e.g., one or more data stores) can include, but is not limited to, RAM, ROM, EEPROM, flash memory or other memory technology, CD ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is a system for a convolutional neural network (CNN) comprising: a convolution component configured to perform convolution operations that extract data from one or more images, and provide the data to one or more rectified linear units (RELUs) configured to generate non-linear convolution output data; a pooling component configured to generate pooling outputs via a pipelining process in parallel with the convolution operations based on a pooling window for a subset of the non-linear convolution output data; and a fully connected (FC) component configured to form an artificial neural network (ANN) that provides ANN outputs based on the pooling outputs and enable a recognition of a pattern in the one or more images based on the ANN outputs.

Example 2 includes the subject matter of Example 1, wherein the pooling component is further configured to determine an availability of the pooling window, and process a plurality of pooling windows that correspond to different subsets of the non-linear convolution output data.

Example 3 includes the subject matter of any one of Examples 1-2, including or omitting any elements as optional, wherein the FC component comprises a first layer of neurons coupled to a succeeding layer of neurons, wherein neurons of the first layer and the succeeding layer comprise a net function node configured to provide a net function output and an output function node configured to generate an output function output from the net function output, respectively.

Example 4 includes the subject matter of any one of Examples 1-3, including or omitting any elements as optional, wherein the first layer of neurons comprises first neurons having a first set of same net function inputs, respectively, that receive outputs from at least one preceding layer comprising at least one of: the pooling outputs, the data from the convolution component, or the non-linear convolution output data, and the succeeding layer of neurons comprises second neurons having a second set of same net function inputs that receive same outputs from the first layer of neurons, respectively.

Example 5 includes the subject matter of any one of Examples 1-4, including or omitting any elements as optional, wherein the net function node is configured to perform a dot product multiplication of inputs and weights associated with the inputs, respectively, and a sum of corresponding results, and the output function node is configured to execute an activation function on the net function output to provide an output of an FC component, wherein the output function node of a first neuron operates in parallel with the net function node of a second neuron via another pipelining process.

Example 6 includes the subject matter of any one of Examples 1-5, including or omitting any elements as optional, wherein the pooling component is further configured to generate a reduction in a volume of the non-linear convolution output data, and process the non-linear convolution output data into scaled invariant data as the pooling outputs to be provided to the FC component.

Example 7 includes the subject matter of any one of Examples 1-6, including or omitting any elements as optional, further comprising: an observation unit component comprising one or more first tables corresponding to the pipelining process of the pooling component with the convolution component, and a transaction watch component configured to detect a write operation to a memory location that is in the one or more first tables by the convolution component and trigger a statistical operation of the pooling component in response to the convolution component performing the write operation to the memory location in the one or more first tables, and generate a plurality of outputs from the one or more first tables to the pooling component.

Example 8 includes the subject matter of any one of Examples 1-7, including or omitting any elements as optional, wherein the plurality of outputs comprise at least one of: a pooling input address associated with a convolution watch address of the one or more first tables identifying markers associated with the pooling window, the trigger to the operations of the pooling component, a pooling output address pointing to an address in the one or more first tables with a result of the statistical operation, or a convolution layer identifier (ID) associating the one or more first tables to the pooling component.

Example 9 includes the subject matter of any one of Examples 1-8, including or omitting any elements as optional, wherein a second table associated with the FC layer comprises at least one of: a neuron net function output address corresponding to a net function output of a net function node of the FC component, a neuron activation output address corresponding to an ANN output of an output function node, and an activation function that is executed by the output function node.

Example 10 is an apparatus for a convolutional neural network (CNN), comprising: one or more processors, coupled to a memory that includes instructions to execute operations of the one or more processors, configured to: extract data features that comprise convolutional data sets via one or more filter kernels from one or more images; transform the convolutional data sets into sets of nonlinear output data; and generate pooling outputs from pooling operations on the sets of nonlinear output data via a pipelining process that operates in parallel with at least one of an extraction of the data features or a transformation of the convolutional data sets, in response to determining that a first set of nonlinear data among the sets of nonlinear output data or a first set of convolutional data of the convolutional data sets is available.

Example 11 includes the subject matter of Example 10, wherein the one or more processors are further configured to extract the data features by performing sliding convolutions with one or more convolution windows sliding over portions of the one or more images to generate feature maps of the one or more images and determine a likelihood of a presence of a data feature corresponding to the one or more convolution windows.

Example 12 includes the subject matter of Examples 10-11, including or omitting any elements as optional, wherein the one or more processors are further configured to: extract a second set of convolutional data of the convolutional data sets from the one or more images via a convolution operation in parallel with a pooling operation that processes the first set of convolutional data of the convolutional data sets into a scaled invariant set of convolutional data based on a pooling window.

Example 13 includes the subject matter of Examples 10-12, including or omitting any elements as optional, wherein the one or more processors are further configured to: process the pooling outputs via a fully connected (FC) component by classifying the pooling outputs corresponding to the sets of nonlinear data into categories.

Example 14 includes the subject matter of Examples 10-13, including or omitting any elements as optional, wherein the one or more processors are further configured to: perform a net function comprising a dot product of inputs and weights and a sum of weighted inputs from the pooling outputs at a first FC component to generate a neuron net function output; and perform an output function on the neuron net function output at the first FC component to generate a neuron activation function output in parallel with performing another net function comprising another dot product and another sum of the inputs from the pooling outputs at a succeeding FC component to generate a second neuron net function output.

Example 15 includes the subject matter of Examples 10-14, including or omitting any elements as optional, wherein the first FC component and the succeeding FC component comprise data flow processes that operate without fetching an instruction from the memory and in response to input data from the pooling outputs or a preceding FC component being available at neuron inputs.

Example 16 includes the subject matter of Examples 10-15, including or omitting any elements as optional, wherein the one or more processors are further configured to: populate a table comprising entries for a neuron net function output address corresponding to a net function output, a neuron activation function output address corresponding to an output of a neuron, and an activation function executed by an output function of the neuron to generate the output of the neuron based on the net function output.

Example 17 is a method for a convolutional neural network (CNN), comprising: performing, via one or more processors, convolution operations that extract data from one or more images; providing, via the one or more processors, the data to one or more rectified linear units (RELUs) configured to generate non-linear convolution output data; generating, via the one or more processors, pooling outputs in parallel with the convolution operations based on a pooling window for a subset of the non-linear convolution output data; and providing, via the one or more processors, artificial neural network (ANN) outputs of an ANN based on the pooling outputs.

Example 18 includes the subject matter of Example 17, further comprising: generating a determination of an availability of the pooling window, and process a plurality of pooling windows that correspond to different subsets of the non-linear convolution output data.

Example 19 includes the subject matter of Examples 17-18, including or omitting any elements as optional, further comprising: providing, in a first fully connected (FC) layer of the ANN, first net function outputs of first net function nodes to first output function nodes; and providing first output function outputs of the first output function nodes to second net function nodes of a succeeding FC layer that is configured to generate the ANN outputs.

Example 20 includes the subject matter of Examples 17-19, including or omitting any elements as optional, further comprising: determining a completion of a first net function node of the first net function nodes; and initiating, in response to the completion, a second net function of the second net function nodes in parallel with a first output network node generating an output function of the first FC layer.

It is to be understood that aspects described herein may be implemented by hardware, software, firmware, or any combination thereof. When implemented in software, functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor may be a microprocessor, but, in the alternative, processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration. Additionally, at least one processor may comprise one or more modules operable to perform one or more of the acts and/or actions described herein.

For a software implementation, techniques described herein may be implemented with modules (e.g., procedures, functions, and so on) that perform functions described herein. Software codes may be stored in memory units and executed by processors. Memory unit may be implemented within processor or external to processor, in which case memory unit can be communicatively coupled to processor through various means as is known in the art. Further, at least one processor may include one or more modules operable to perform functions described herein.

Techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long- range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical discs (e.g., compact disc (CD), digital versatile disc (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform functions described herein.

Further, the acts and/or actions of a method or algorithm described in connection with aspects disclosed herein may be embodied directly in hardware, in a software module executed by a processor, or a combination thereof. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to processor, such that processor can read information from, and write information to, storage medium. In the alternative, storage medium may be integral to processor. Further, in some aspects, processor and storage medium may reside in an ASIC. Additionally, ASIC may reside in a user terminal. In the alternative, processor and storage medium may reside as discrete components in a user terminal. Additionally, in some aspects, the acts and/or actions of a method or algorithm may reside as one or any combination or set of codes and/or instructions on a machine-readable medium and/or computer readable medium, which may be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature may have been disclosed with respect to only one of several implementations, such feature may be combined with one or more other features of the other implementations as may be desired and advantageous for any given or particular application.

What is claimed is:

1. A system for a convolutional neural network (CNN) comprising:
a convolution component configured to perform convolution operations that extract data from one or more images, and provide the data to one or more rectified linear units (RELUs) configured to generate non-linear convolution output data;
a pooling component configured to generate pooling outputs via a pipelining process in parallel with the convolution operations based on a pooling window for a subset of the non-linear convolution output data;
an observation unit component comprising one or more first tables corresponding to the pipelining process of the pooling component with the convolution component;
a transaction watch component configured to detect a write operation to the one or more first tables by the convolution component and trigger a statistical operation of the pooling component in response to the convolution component performing the write operation to the one or more first tables, and generate a plurality of outputs from the one or more first tables to the pooling component; and
a fully connected (FC) component configured to form an artificial neural network (ANN) that provides ANN outputs based on the pooling outputs and enable a recognition of a pattern in the one or more images based on the ANN outputs.

2. The system of claim 1, wherein the pooling component is further configured to determine an availability of the pooling window, and process a plurality of pooling windows that correspond to different subsets of the non-linear convolution output data.

3. The system of claim 1, wherein the FC component comprises a first layer of neurons coupled to a succeeding layer of neurons, wherein neurons of the first layer and the succeeding layer comprise a net function node configured to provide a net function output and an output function node configured to generate an output function output from the net function output, respectively.

4. The system of claim 3, wherein the first layer of neurons comprises first neurons having a first set of same net function inputs, respectively, that receive outputs from at least one preceding layer comprising at least one of: the pooling outputs, the data from the convolution component, or the non-linear convolution output data, and the succeeding layer of neurons comprises second neurons having a second set of same net function inputs that receive same outputs from the first layer of neurons, respectively.

5. The system of claim 3, wherein the net function node is configured to perform a dot product multiplication of inputs and weights associated with the inputs, respectively, and a sum of corresponding results, and the output function node is configured to execute an activation function on the net function output to provide an output of an FC component, wherein the output function node of a first neuron operates in parallel with the net function node of a second neuron via another pipelining process.

6. The system of claim 1, wherein the pooling component is further configured to generate a reduction in a volume of the non-linear convolution output data, and process the non-linear convolution output data into scaled invariant data as the pooling outputs to be provided to the FC component.

7. The system of claim 1, wherein the plurality of outputs comprise at least one of: a pooling input address associated with a convolution watch address of the one or more first tables identifying markers associated with the pooling window, the trigger to the operations of the pooling component, a pooling output address pointing to an address in the one or more first tables with a result of the statistical operation, or a convolution layer identifier (ID) associating the one or more first tables to the pooling component.

8. The system of claim 1, wherein a second table associated with the FC layer comprises at least one of: a neuron net function output address corresponding to a net function output of a net function node of the FC component, a neuron activation output address corresponding to an ANN output of an output function node, and an activation function that is executed by the output function node.

9. An apparatus for a convolutional neural network (CNN), comprising:
one or more processors, coupled to a memory that includes instructions to execute operations of the one or more processors, configured to:
extract data features that comprise convolutional data sets via one or more filter kernels from one or more images;
transform the convolutional data sets into sets of non-linear output data;
generate pooling outputs from pooling operations on the sets of nonlinear output data via a pipelining process that operates in parallel with at least one of an extraction of the data features or a transformation of the convolutional data sets, in response to determining that a first set of nonlinear data among the sets of nonlinear output data or a first set of convolutional data of the convolutional data sets is available; and
populate a table comprising entries for a neuron net function output address corresponding to a net function output, a neuron activation function output address corresponding to an output of a neuron, and an activation function executed by an output function of the neuron to generate the output of the neuron based on the net function output.

10. The apparatus of claim 9, wherein the one or more processors are further configured to extract the data features by performing sliding convolutions with one or more convolution windows sliding over portions of the one or more images to generate feature maps of the one or more images and determine a likelihood of a presence of a data feature corresponding to the one or more convolution windows.

11. The apparatus of claim 9, wherein the one or more processors are further configured to:
extract a second set of convolutional data of the convolutional data sets from the one or more images via a convolution operation in parallel with a pooling operation that processes the first set of convolutional data of the convolutional data sets into a scaled invariant set of convolutional data based on a pooling window.

12. The apparatus of claim 9, wherein the one or more processors are further configured to:
process the pooling outputs via a fully connected (FC) component by classifying the pooling outputs corresponding to the sets of nonlinear data into categories.

13. The apparatus of claim 12, wherein the one or more processors are further configured to:

perform a net function comprising a dot product of inputs and weights and a sum of weighted inputs from the pooling outputs at a first FC component to generate a neuron net function output; and perform an output function on the neuron net function output at the first FC component to generate a neuron activation function output in parallel with performing another net function comprising another dot product and another sum of the inputs from the pooling outputs at a succeeding FC component to generate a second neuron net function output.

14. The apparatus of claim 13, wherein the first FC component and the succeeding FC component comprise data flow processes that operate without fetching an instruction from the memory and in response to input data from the pooling outputs or a preceding FC component being available at neuron inputs.

15. A method for a convolutional neural network (CNN), comprising:

performing, via one or more processors, convolution operations that extract data from one or more images;

providing, via the one or more processors, the data to one or more rectified linear units (RELUs) configured to generate non-linear convolution output data;

generating, via the one or more processors, pooling outputs in parallel with the convolution operations based on a pooling window for a subset of the non-linear convolution output data;

detecting, via the one or more processors, a write to one or more tables corresponding to pipelining processes for the pooling outputs in parallel with the convolution operations to trigger a statistical operation of the pipelining processes for generation of the pooling outputs; and providing, via the one or more processors, artificial neural network (ANN) outputs of an ANN based on the pooling outputs.

16. The method of claim 15, further comprising:
generating a determination of an availability of the pooling window, and process a plurality of pooling windows that correspond to different subsets of the non-linear convolution output data.

17. The method of claim 15, further comprising:
providing, in a first fully connected (FC) layer of the ANN, first net function outputs of first net function nodes to first output function nodes; and providing first output function outputs of the first output function nodes to second net function nodes of a succeeding FC layer that is configured to generate the ANN outputs.

18. The method of claim 17, further comprising:
determining a completion of a first net function node of the first net function nodes; and initiating, in response to the completion, a second net function of the second net function nodes in parallel with a first output network node generating an output function of the first FC layer.

* * * * *